US008954056B2

(12) United States Patent
Shimizu

(10) Patent No.: US 8,954,056 B2
(45) Date of Patent: Feb. 10, 2015

(54) WIRELESS COMMUNICATION SYSTEM, RELAY STATION, USER EQUIPMENT, AND WIRELESS COMMUNICATION METHOD

(71) Applicant: Fujitsu Limited, Kawasaki-shi, Kanagawa (JP)

(72) Inventor: Masatsugu Shimizu, Yokohama (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 13/776,991

(22) Filed: Feb. 26, 2013

(65) Prior Publication Data

US 2013/0171986 A1 Jul. 4, 2013

Related U.S. Application Data

(63) Continuation of application No. PCT/JP2010/066168, filed on Sep. 17, 2010.

(51) Int. Cl.
*H04W 24/00* (2009.01)
*H04W 76/02* (2009.01)
*H04B 7/155* (2006.01)
*H04W 16/28* (2009.01)
(Continued)

(52) U.S. Cl.
CPC .......... *H04W 76/028* (2013.01); *H04B 7/155* (2013.01); *H04W 16/28* (2013.01); *H04W 24/04* (2013.01); *H04W 76/068* (2013.01); *H04W 84/047* (2013.01)
USPC .......................................... 455/423; 370/216

(58) Field of Classification Search
CPC ..... H04W 28/04; H04W 16/26; H04W 48/08; H04W 16/32

USPC .................................. 455/423; 370/225, 216
See application file for complete search history.

(56) References Cited

U.S. PATENT DOCUMENTS 8,392,607 B2 * 3/2013 Ishii et al. ..................... 709/238
8,644,811 B2 * 2/2014 Tsao et al. ..................... 455/418
(Continued)

FOREIGN PATENT DOCUMENTS

JP 2008-79311 A 4/2008
JP 2010-4503 1/2010

OTHER PUBLICATIONS

International Search Report, mailed in connection with PCT/JP2010/066168 and mailed Dec. 21, 2010.
(Continued)

*Primary Examiner* — Nathan Taylor
(74) *Attorney, Agent, or Firm* — Fujitsu Patent Center

(57) ABSTRACT

A wireless communication system includes a base station, a user equipment, and a relay station that relays a wireless signal sent and received between the base station and the user equipment. The relay station includes a first processor that executes reconnection processing with the base station, every time a plurality of time durations with respect to certain timing elapse, for a call corresponding to each time duration, and a transmitter that, if a reconnection with the base station is not made until a predetermined time elapses after a start of the reconnection processing for the call corresponding to the each time duration, sends a message for notifying a call disconnection of the corresponding call in response to the lapse of the predetermined time. The user equipment includes a receiver, and a second processor that executes call disconnection processing on the corresponding call in response to the message being received.

13 Claims, 14 Drawing Sheets

(51) Int. Cl.
*H04W 24/04* (2009.01)
*H04W 76/06* (2009.01)
*H04W 84/04* (2009.01)

(56) References Cited

U.S. PATENT DOCUMENTS

| | | | |
|---|---|---|---|
| 2007/0015512 A1* | 1/2007 | Hunzinger | 455/439 |
| 2008/0074994 A1* | 3/2008 | Jen | 370/218 |
| 2008/0076404 A1 | 3/2008 | Jen | |
| 2008/0076405 A1 | 3/2008 | Jen | |
| 2008/0254787 A1* | 10/2008 | Tsao et al. | 455/422.1 |
| 2011/0019532 A1* | 1/2011 | Jung et al. | 370/216 |
| 2011/0053588 A1* | 3/2011 | Al-Khudairi et al. | 455/424 |
| 2011/0092236 A1 | 4/2011 | Iwamura et al. | |
| 2011/0194407 A1* | 8/2011 | Ji et al. | 370/226 |
| 2011/0242970 A1* | 10/2011 | Prakash et al. | 370/225 |
| 2011/0268014 A1* | 11/2011 | Mildh et al. | 370/315 |
| 2011/0314522 A1* | 12/2011 | Palanigounder et al. | 726/4 |
| 2012/0142336 A1* | 6/2012 | Van Phan et al. | 455/423 |
| 2012/0327801 A1* | 12/2012 | Seo et al. | 370/252 |
| 2013/0122892 A1* | 5/2013 | Morioka et al. | 455/422.1 |
| 2014/0080468 A1* | 3/2014 | Zhang et al. | 455/418 |

OTHER PUBLICATIONS

Institute for Information Industry (III), Coiler Corporation, RN actions on detecting Radio Link Failure of UN, 3GPP TSG-RAN WG2 #69bis, R2-102232 (Apr. 2010)—Refer to ISR filed herewith and cited below at NPL section.

Alcatel-Lucent, [70b#14]-LTE: Relay recovery, 3GPP TSG-RAN WG2 Meeting #71, R2-104756 (Aug. 2010)—Refer to ISR filed herewith and cited below at NPL section.

Hamachiyo, Takahiro, et al., "A QoS-Aware Energy-Efficient Hybrid MAC Protocol in WMSNs," IEICE Technical Report, vol. 109, No. 382, Jan. 21-22, 2010, pp. 87-92, with English Translation.

Japanese Office Action of JP Patent Application 2012-533798 dated Mar. 4, 2014, with English Translation, 6 pages. Please note reference #1 cited herein, was previously cited in an IDS filed Feb. 26, 2013.

* cited by examiner

FIG. 10

| Services | QoS | QoS Groups |
|---|---|---|
| VoIP | 1 | 1 |
| Video Streaming | 2 | |
| FTP | 3 | 3 |
| HTTP | 4 | |

# WIRELESS COMMUNICATION SYSTEM, RELAY STATION, USER EQUIPMENT, AND WIRELESS COMMUNICATION METHOD

CROSS-REFERENCE TO RELATED APPLICATIONS

This application is a continuation Application of a PCT international application No. PCT/JP2010/066168 filed on Sep. 17, 2010 in Japan, the entire contents of which are incorporated by reference.

FIELD

The present invention relates to a wireless communication system, a relay station, a user equipment, and a wireless communication method. The wireless communication system includes a relay station that relays wireless signals sent and received between a base station and a user equipment, for example.

BACKGROUND

In recent years in the field of wireless communications, various services, such as Internet accesses, distribution of streaming broadcast, distribution of contents (e.g., music and videos), have been provided, in addition to voice calls. An increase in the communication speeds and wider connection have created needs for provision of such services in higher qualities anywhere.

For enhancing the communication speeds, the Long Term Evolution (LTE) standard has been stipulated by the 3rd Generation Partnership Project (3GPP), one of the standardization organization, and has been put into service. The LTE scheme achieves maximum communication speeds of about 300 Mbps for downlinks and about 150 Mbps for uplinks.

For enhancing the connection areas, in the LTE-Advanced (LTE-A) which is the next-generation standard of the LTE, introduction of a relay station that relays wireless signals sent and received between user equipments and a base station has been discussed.

Note that in a communication system compliant with the LTE scheme, a technique has been proposed to ensure the validity of a reconnection request to a base station when a user equipment detects a radio link failure (RLF) in a radio resource control (RRC) connection (refer to the following Patent Reference 1).

Patent Reference 1: Japanese Laid-open Patent Publication No. 2010-4503

For example, if a user equipment moves and the wireless propagation environment around the user equipment varies accordingly, the reception quality at the user equipment may deteriorate. Since the connection with the base station may become unstable due to any detonation of the reception quality, a user equipment monitors the status of the connection with base station, based on the reception quality of wireless signals.

If the reception quality deteriorates to the level hindering the wireless communication from being continued and if the status of the reception quality does not recover within a certain time duration, the user equipment detects that an RLF occurs and executes reconnection processing to switch connections to another base station, another cell, another sector, or the like.

Here, an example of the reconnection processing by a user equipment is depicted in FIG. 1.

As depicted in FIG. 1, once a user equipment establishes a connection with a base station in a predetermined connection sequence and initiates a communication (Step S 1), the user equipment measures the reception quality of wireless signals on a link (access link) between the user equipment and the base station at regular or irregular intervals (Step S 2).

The user equipment then compares the measured reception quality against a predetermined threshold level, and detects that a link error occurs if the reception quality is smaller than the predetermined threshold level (Step S 3).

Then, if no link error is detected (the NO route from Step S 3), the user equipment repeats the processing in Steps S 2 and S 3. In contrast, if a link error is detected (the YES route from Step S 3), the user equipment starts s timer (status recovery monitoring timer), for monitoring whether or not link error status is not recovered within a certain time (Step S 4).

The user equipment then monitors whether or not the link error status on the access link recovers (Step S 5). For example, the user equipment compares the measured reception quality against a predetermined threshold level, and monitors whether or not the reception quality is equal to or greater than the predetermined threshold level.

The user equipment then determines whether or not the status of the access link recovers (Step S 6). If the status of the access link recovers (the YES route from Step S 6), the status recovery monitoring timer is stopped (Step S 7) and the flow transitions to Step S 2. In contrast, if the status of the access link does not recover (the NO route from Step S 6), the user equipment determines whether or not the status recovery monitoring timer times out (Step S 8).

If the status recovery monitoring timer does not time out (the NO route from Step S 8), the user equipment repeats the processing in Steps S 5, S 6 and S 8. In contrast, if the status recovery monitoring timer times out (the YES route from Step S 8), the user equipment detects an occurrence of an RLF and executes reconnection processing to switch the connection to another base station, another cell, another sector, or the like (Step S 9).

The user equipment then determines whether or not reconnection processing succeeds (Step S 10). If it is determined that the reconnection processing succeeds (the YES route from Step S 10), the flow transitions to Step S 2 to transition to the normal state. In contrast, if it is determined that the reconnection processing fails (the NO route from Step S 10), call disconnection processing is performed to terminate the communication with the base station (Step S 11). Note that the user equipment that terminates the communication transitions to the reception standby status where an execution of a connection sequence with the base station is waited, for example.

Here, the timeout value of the status recovery monitoring timer (hereinafter, also simply referred to as "timer value") is determined based on the quality of service (QoS) of the service used by the user equipment.

For example, if the user equipment is using a voice communication service, the time until an RLF is detected becomes longer and silence or noises are generated as the timer value is increased, which may annoy the user. Hence, in the case of the voice communication service, the timer value is set to a smaller value.

In contrast, if the user equipment is using a communication service, such as packet communication call, of non real time communications (e.g., web browsing), a certain delay is permissible as long as the communication is available. Hence, the timer value is set to a value longer than the value used for the voice communication service.

As examples of the timer values for the Universal Mobile Telecommunications System (UMTS), the 3GPP TS25.331 stipulates T314 as the timer value for circuit switching calls, such as voice calls, and T315 as the timer value for packet exchange calls. The initial values of T314 and T315 are 12 seconds and 180 seconds, respectively.

However, documents, such as Patent Reference 1 described above, do not specifically propose how a relay station used in a LTE-A communication system executes RLF detect processing and reconnection processing on a link (relay link) between a base station and the relay station. Hence, effective wireless communication technique cannot be provided in such a wireless communication system.

SUMMARY (1) The first aspect is a wireless communication system including: a base station; a user equipment; and a relay station that relays a wireless signal sent and received between the base station and the user equipment, wherein the relay station includes: a first processor that executes reconnection processing with the base station, every time a plurality of time durations with respect to certain timing elapse, for a call corresponding to each time duration; and a transmitter that, if the relay station is not capable of reconnecting with the base station until a predetermined time elapses after a start of the reconnection processing for the call corresponding to the each time duration, sends a message to the user equipment for notifying a call disconnection of the corresponding call in response to the lapse of the predetermined time, and the user equipment includes: a receiver that receives the message sent from the relay station; and a second processor that executes call disconnection processing on the corresponding call in response to the message being received.

(2) Additionally, the second aspect is a relay station that relays a wireless signal sent and received between a base station and a user equipment, the relay station including: a processor that executes reconnection processing with the base station, every time a plurality of time durations with respect to certain timing elapse, for a call corresponding to each time duration; and a transmitter that, if the relay station is not capable of reconnecting with the base station until a predetermined time elapses after a start of the reconnection processing for the call corresponding to the each time duration, sends a message to the user equipment for notifying a call disconnection of the corresponding call in response to the lapse of the predetermined time.

(3) Further, the third aspect is a user equipment that sends and receives a wireless signal to and from a base station via a relay station, the user equipment including: a receiver that receives a message that is sent from the relay station, if the relay station is not capable of reconnecting with the base station until a predetermined time elapses after a start of reconnection processing, every time a plurality of time durations with respect to the certain timing elapse, for a call corresponding to each time duration, the message notifying a call disconnection in response to the lapse of the predetermined time; and a processor that executes call disconnection processing on the corresponding call in response to the message being received.

(4) Further, the fourth aspect is a wireless communication method used in a wireless communication system including a base station, a user equipment, and a relay station that relays a wireless signal sent and received between the base station and the user equipment, the method including: by the relay station, executing reconnection processing with the base station, every time a plurality of time durations with respect to certain timing elapse, for a call corresponding to each time duration; and if the relay station is not capable of reconnecting with the base station until a predetermined time elapses after a start of the reconnection processing for the call corresponding to the each time duration, sending a message to the user equipment for notifying a call disconnection of the corresponding call in response to the lapse of the predetermined time, by the user equipment, receiving the message sent from the relay station; and executing call disconnection processing on the corresponding call in response to the message being received.

Wireless communications can be effectively executed in a wireless communication system and the quality of service at the user equipment can be maintained.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF THE DRAWINGS

FIG. 10 is a diagram illustrating an example of how QoS groups are set;

DESCRIPTION OF EMBODIMENTS

Hereinafter, embodiments of the present disclosure will be described with reference to the drawings. Note that the embodiment described below is described by way of example only, and various modifications and applications of techniques that are not provided explicitly in the following embodiment and variations are not intended to be excluded. It is noted that the embodiment and variations can be modified in various manner without departing from the scope of the present disclosure.

(1) Description of an Embodiment (1.1) Wireless Communication System

Figure 1:
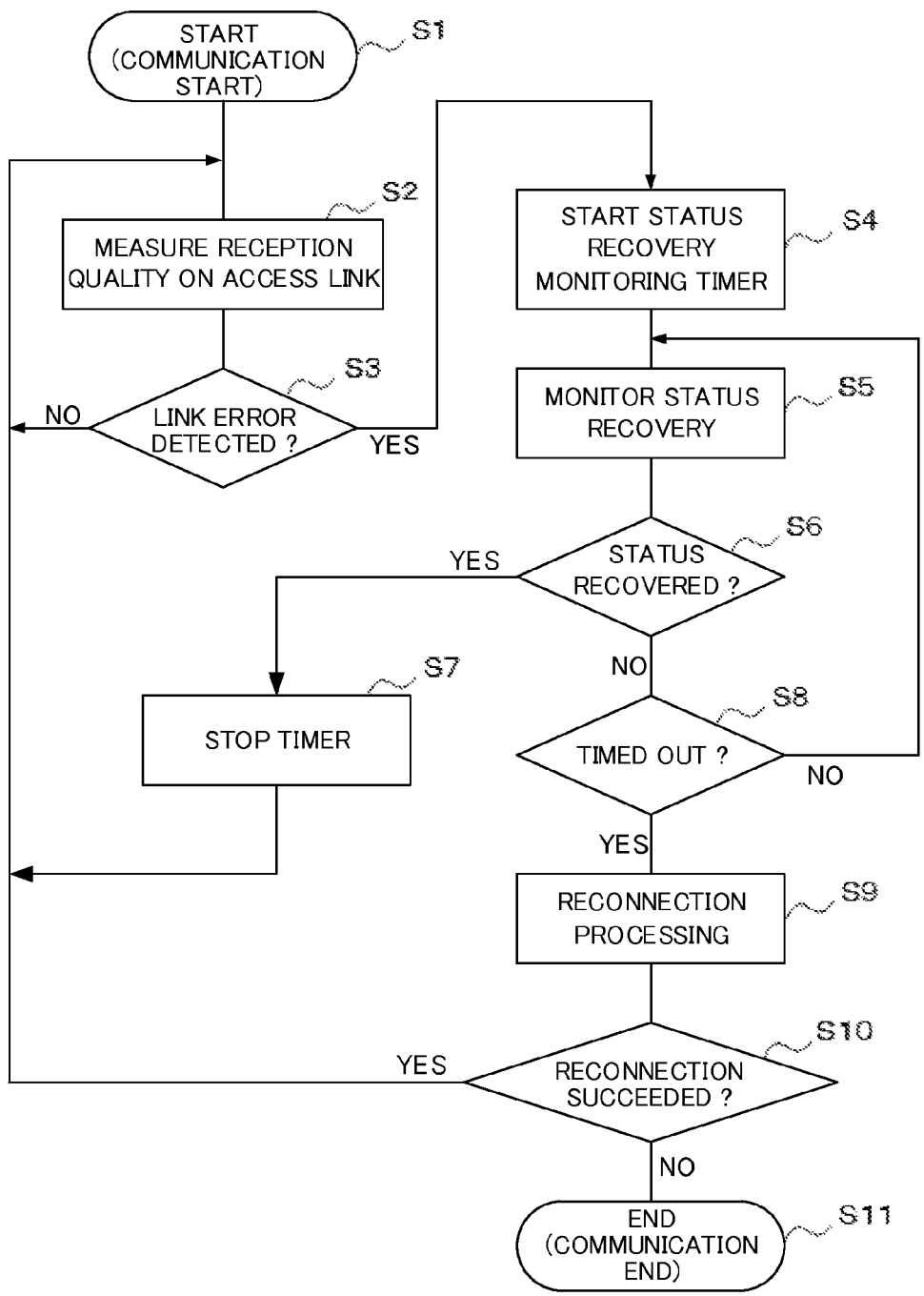
FIG. 1 is a flow chart illustrating an example of reconnection processing in a user equipment.
Figure 2:
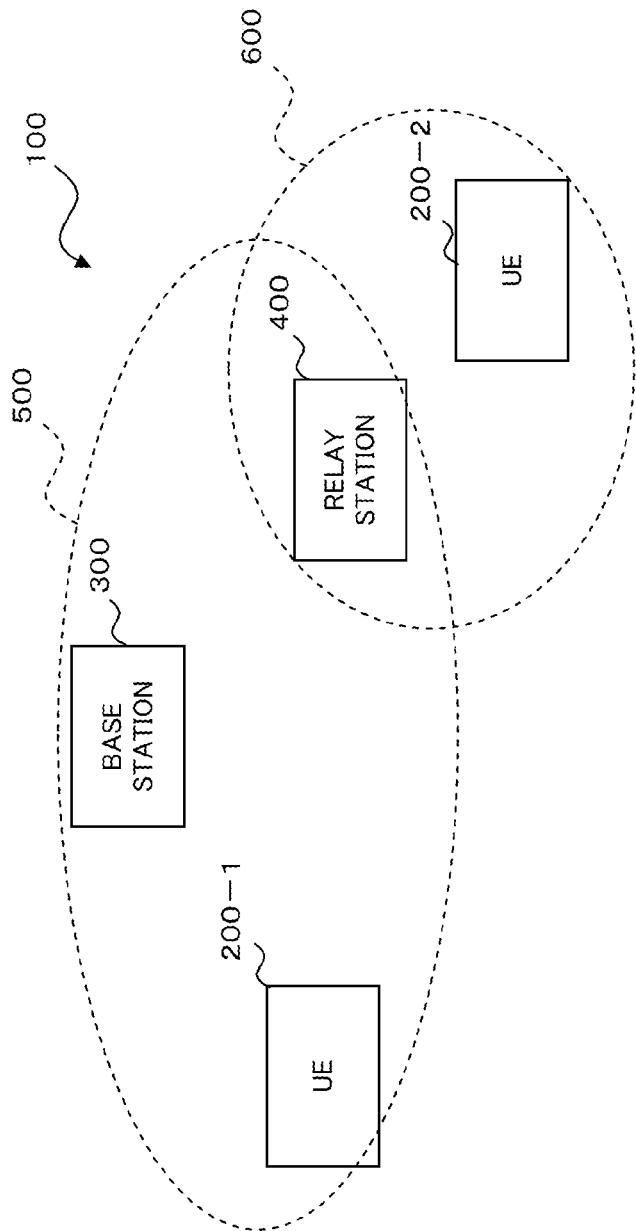
FIG. 2 is a diagram illustrating an example of the configuration of a wireless communication system in accordance with an embodiment.

FIG. 2 is a diagram illustrating an example of the configuration of a wireless communication system in accordance with an embodiment.

A wireless communication system 100 depicted in FIG. 2 includes user equipments (UEs) 200-1 and 200-2, a base station 300, and a relay station 400, for example. Note that, in the following description, the user equipments 200-1 and 200-2 may be collectively refereed to as "user equipments 200" when no distinction among them is made. For example, the user equipments 200 may be carried by users, and in that sense, they are synonymous with wireless mobile terminals or mobile stations (MSs). The numbers of the user equipments 200, the base station 300, and the relay station 400 are not limited to the particular numbers exemplified in FIG. 2. Hereinafter, the connection between the base station 300 and the relay station 400 will be referred to as a relay link, whereas the connections between the base station 300 and the user equipments 200 and the connections between the relay station 400 and the user equipments 200 will be referred to as access links.

Here, the base station 300 provides a communication service area 500 made from cells or sectors, and can wirelessly communicate with the user equipments 200 and the relay station 400 located in that communication service area 500.

For example, the base station 300 can wirelessly communicate directly with the user equipment 200-1 located in the communication service area 500 provided by the base station 300, through the access link. The base station 300 can also wirelessly communicate directly with the relay station 400 located in the communication service area 500 provided by the base station 300, through the relay link.

In contrast, the base station 300 cannot wirelessly communicate directly with the user equipment 200-2, in the situation depicted in FIG. 2, since the user equipment 200-2 is not located in the communication service area 500 provided by the base station 300.

The relay station 400 relays wireless signals sent and received between the base station 300 and the user equipment 200-2. In the example depicted in FIG. 2, the relay station 400 is located to the location so as to expand the communication service area. Note that the relay station 400 may be located to a fixed certain location, or may be movable. If the relay station 400 is configured as a mobile station, the communication service area 600 provided by the relay station 400 is also made movable.

For example, the relay station 400 can relay a wireless signal received from the base station 300 to the user equipment 200-2 located in the communication service area 600 provided by the relay station 400, via the access link. The relay station 400 can also relay a wireless signal received from the user equipment 200-2 located in the communication service area 600 provided by the relay station 400 to the base station 300, via the relay link.

The user equipment 200-1 can wirelessly communicate directly with the base station 300 that provides the communication service area 500 where the user equipment 200-1 belongs, through the access link. The user equipment 200-2 can wirelessly communicate indirectly with the base station 300, through the relay station 400 that provides the communication service area 600 where the user equipment 200-2 belongs.

Hereinafter, examples of the configurations of the user equipments 200, the base station 300, and the relay station 400 will be described. Although the configurations of the user equipments 200, the base station 300, and the relay station 400 will be described in the context of the LTE standard, it is noted that they are exemplary and the present invention is not limited to the particular configurations described below.

(1.2) User Equipment 200

Figure 3:
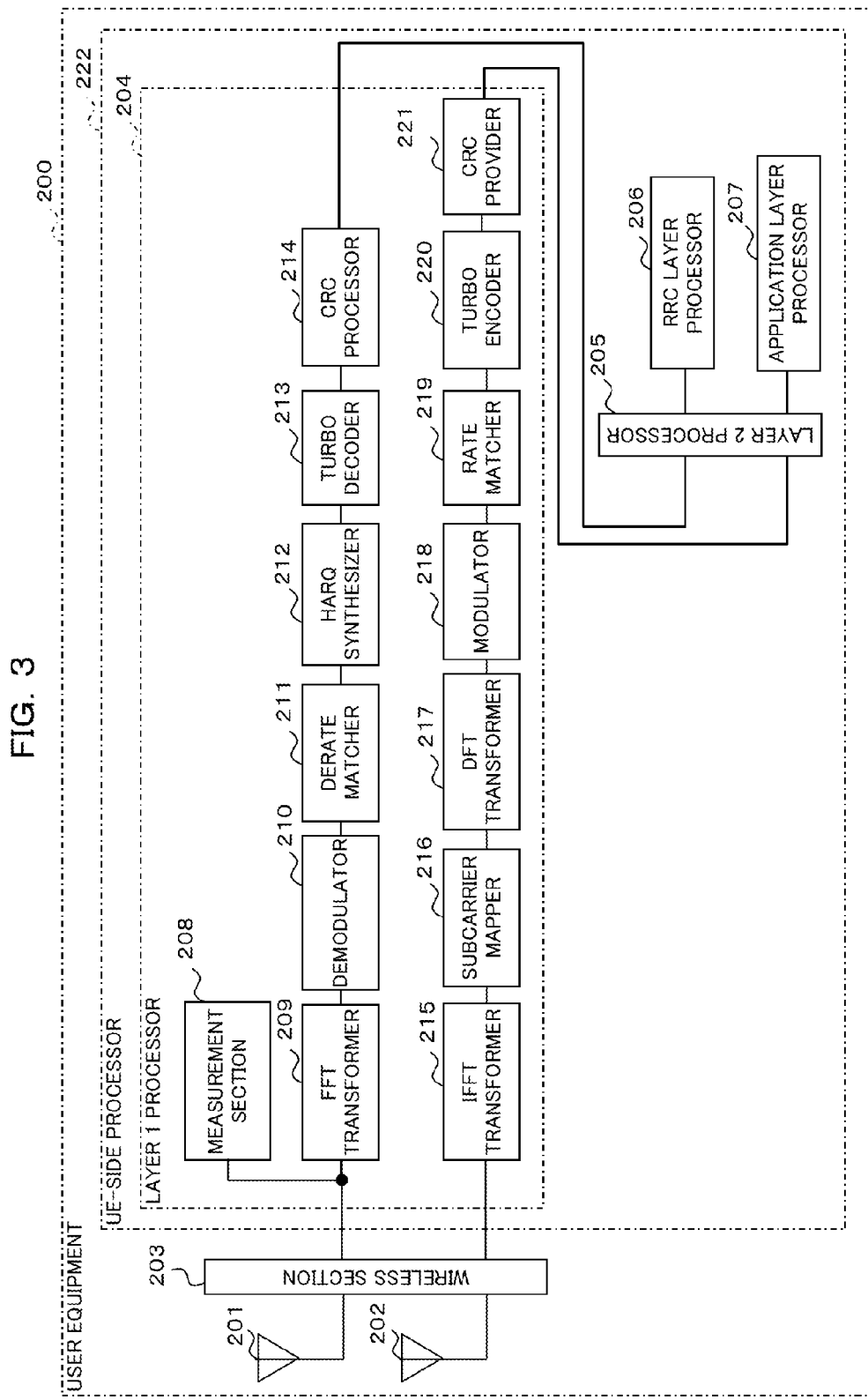
FIG. 3 is a diagram illustrating an example of the configuration of a user equipment depicted in FIG. 2.

FIG. 3 is a diagram illustrating an example of the configuration of a user equipment 200 in accordance with an embodiment.

The user equipment 200 depicted in FIG. 3 includes a reception antenna 201, a transmission antenna 202, a wireless section 203, and a UE-side processor 222, for example.

The reception antenna 201 receives wireless signals. The wireless signals received by the reception antenna 201 include wireless signals sent from the base station 300 or the relay station 400, for example.

In other words, the reception antenna 201 may function as an example of a receiver that receives a message that is sent from the relay station 400, if the relay station 400 is not capable of reconnecting with the base station 300 until a predetermined time elapses after a start of reconnection processing for a call corresponding to each time duration, the message notifying a call disconnection in response to the lapse of the predetermined time, as will be described later.

The transmission antenna 202 sends wireless signals. The wireless signals sent by the transmission antenna 202 are received by the base station 300 or the relay station 400, for example.

Note that the reception antenna 201 and the transmission antenna 202 are duplexed using an antenna duplexer, for example.

The wireless section 203 converts high-frequency signals received by the reception antenna 201 into baseband signals, and converts generated baseband signals back to high-frequency signals for sending them from the transmission antenna 202.

The UE-side processor 222 executes various types of processing in the user equipment 200. For example, the UE-side processor 222 may function as an example of a second processor that executes call disconnection processing on the corresponding call in response to a message from the relay station 400 notifying a call disconnection.

For that purpose, the UE-side processor 222 includes a Layer 1 processor 204, a Layer 2 processor 205, an RRC layer processor 206, and an application layer processor 207, for example.

The Layer 1 processor 204 executes predetermined data processing on reception and transmission signals in the Layer 1. For that purpose, the Layer 1 processor 204 includes a measurement section 208, a fast Fourier transform (FFT) transformer 209, a demodulator 210, a derate matcher 211, and a hybrid automatic repeat request (HARQ) synthesizer 212, for example. The Layer 1 processor 204 also includes the turbo decoder 213, a cyclic redundancy check (CRC) processor 214, an inverse FFT (IFFT) transformer 215, and a subcarrier mapper 216, for example. The Layer 1 processor 204 further includes a discrete Fourier transform (DFT) transformer 217, a modulator 218, a rate matcher 219, a turbo encoder 220, and a CRC provider 221, for example.

Here, the FFT transformer 209 executes fast Fourier transform processing on a reception signal inputted from the wireless section to demodulate an orthogonal frequency division multiple access (OFDMA) symbol. The OFDMA symbol demodulated by the FFT transformer 209 is sent to the demodulator 210.

The measurement section 208 measures the reception quality level of the reception signal. For example, the measurement section 208 can detect a link error on an access link by comparing the reception quality level of the reception signal against a predetermined level threshold. The measurement section 208 may also have a function to search for cells, for example.

The demodulator 210 demodulates a multi-level modulated symbol sent from the FFT transformer 209. Note that the multi-level modulations include the Quadrature Phase Shift Keying (QPSK), the 16-Quadrature Amplitude Modulation (16QAM), and the 64QAM, for example. The signal demodulated by the demodulator 210 is sent to the derate matcher 211.

In other words, the measurement section 208, the FFT transformer 209 and the demodulator 210 described above function as an example of a demodulation block that executes demodulation processing in accordance with the orthogonal frequency division multiplexing access (OFDMA) scheme, for example.

The derate matcher 211 executes processing on a signal sent from the demodulator 210, to recover expanding or compressed data in accordance with an allocated physical channel resource.

The HARQ synthesizer 212 synthesizes retransmission data by executing HARQ retransmission processing for a signal sent from the derate matcher 211.

The turbo decoder 213 decodes turbo-encoded data sent from the HARQ synthesizer 212 by executing turbo decoding processing on the data.

The CRC processor 214 determines whether data decoded by the turbo decoder 213 contains any error by executing CRC processing.

In other words, the derate matcher 211, the HARQ synthesizer 212, the turbo decoder 213, and the CRC processor 214 described above function as an example of a decoding block that executes decoding processing on a reception signal, for example.

The CRC provider 221 calculates a CRC code from transmission data, provides the transmission data with the calculated CRC code, and sends it to the turbo encoder 220.

The turbo encoder 220 executes turbo coding processing on data sent from the CRC provider 221.

The rate matcher 219 executes processing for expanding or compressing data, on a signal sent from the turbo encoder 220 in accordance with an allocated physical channel resource.

In other words, the rate matcher 219, the turbo encoder 220, and the CRC provider 221 described above function as an example of a coding block that executes coding processing on a transmission signal, for example.

The modulator 218 executes multi-level modulation processing, such as the QPSK, the 16QAM, and the 64QAM, for example, in a signal sent from the rate matcher 219.

The DFT transformer 217 executes single carrier-frequency division multiple access (SC-FDMA) modulation by executing discrete Fourier transformation processing on a signal multi-level modulated by the modulator 218.

The subcarrier mapper 216 allocates transmission data modulated by the DFT transformer 217 to a physical channel resource that has been assigned in advance by the network or the like.

The IFFT transformer 215 executes inverse Fourier transformation processing on transmission data that has been allocated to the physical channel resource by the subcarrier mapper 216.

In other words, the IFFT transformer 215, the subcarrier mapper 216, the DFT transformer 217, and the modulator 218 described above function as an example of a modulation block that executes modulation processing on transmission signal, in accordance with the single carrier frequency division multiplexing access (SC-FDMA) scheme, for example.

The Layer 2 processor 205 is constructed from sublayers, such as the Media Access Control (MAC) layer, the Radio Link Control (RLC) layer, the Packet Data Convergence Protocol (PDCP) layer, for example, and executes data processing for separating or combining processing in accordance with the formats of the respective sublayers. For example, control data separated by the Layer 2 processor 205 is sent to the RRC layer processor 206, whereas user data separated by the Layer 2 processor 205 is sent to the application layer processor 207. Control data sent from the RRC layer processor 206 and user data sent from the application layer processor 207 is combined by the Layer 2 processor 205, and is then sent to the Layer 1 processor 204. The Layer 2 processor 205 can also execute a control to retransmit data.

The RRC layer processor 206 controls wireless resources and the entire device. For example, the RRC layer processor 206 has an RRC Connection control function to page and establish or release (disconnect) calls, a measurement control function to manage and report measurements, and a mobility control function to control connection switching, such as handovers and reselections.

The application layer processor 207 is an upper-level layer that processes user data.

(1.3) Base Station 300

Figure 4:
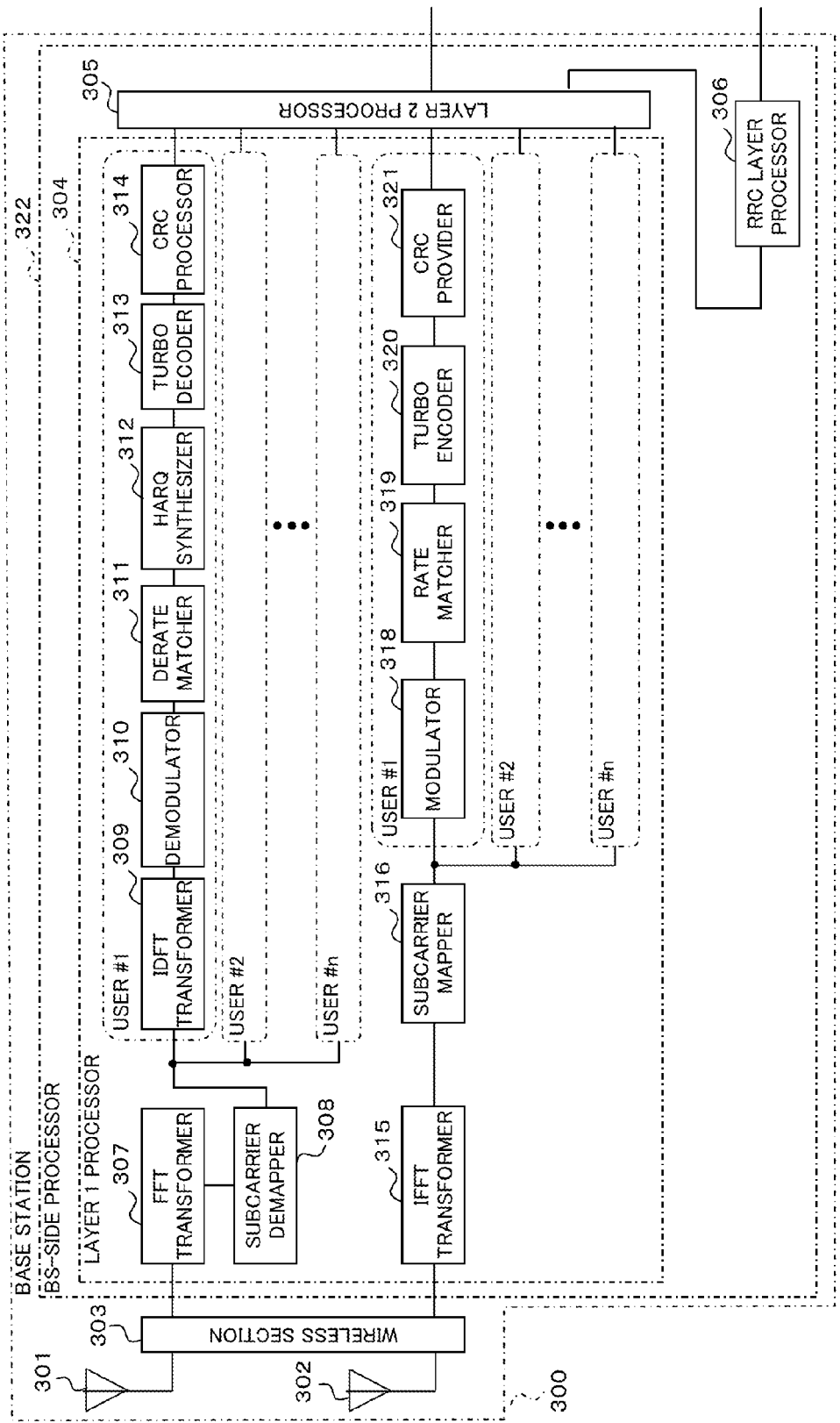
FIG. 4 is a diagram illustrating an example of the configuration of a base station apparatus depicted in FIG. 2.

FIG. 4 is a diagram illustrating an example of the configuration of the base station 300 in accordance with an embodiment.

The base station 300 depicted in FIG. 4 includes a reception antenna 301, a transmission antenna 302, a wireless section 303, and a BS-side processor 322, for example.

The reception antenna 301 receives wireless signals. The wireless signals received by the reception antenna 301 include wireless signals sent from the user equipments 200 or the relay station 400, for example.

The transmission antenna 302 sends wireless signals. The wireless signals sent by the transmission antenna 302 are received by the user equipments 200 or the relay station 400, for example.

Note that the reception antenna 301 and the transmission antenna 302 are duplexed using an antenna duplexer, for example.

The wireless section 303 converts high-frequency signals received by the reception antenna 301 into baseband signals, and converts generated baseband signals back to high-frequency signals for sending them from the transmission antenna 302.

The BS-side processor 322 executes various types of processing in the base station 300. For example, the BS-side processor 322 can execute reconnection processing in response to a reconnection processing request from the relay station 400. The BS-side processor 322 can control not to permit reconnection processing from the relay station 400 under a certain condition which will be described later.

For that purpose, the BS-side processor 322 includes a Layer 1 processor 304, a Layer 2 processor 305, and an RRC layer processor 306, for example.

The Layer 1 processor 304 executes predetermined data processing on reception and transmission signals in the Layer 1. For that purpose, the Layer 1 processor 304 includes an FFT transformer 307, a subcarrier demapper 308, an inverse DFT (IDFT) transformer 309, a demodulator 310, a derate matcher 311, a HARQ synthesizer 312, a turbo decoder 313, and a CRC processor 314, for example. The Layer 1 processor 304 also includes an IFFT transformer 315, a subcarrier mapper 316, a modulator 318, a rate matcher 319, a turbo encoder 320, and a CRC provider 321, for example.

Here, the FFT transformer 307, the demodulator 310, the derate matcher 311, the HARQ synthesizer 312, the turbo decoder 313, and the CRC processor 314 have configurations and functions similar to those of the FFT transformer 209, the demodulator 210, the derate matcher 211, the HARQ synthesizer 212, the turbo decoder 213, and the CRC processor 214, respectively, in the user equipment 200.

Also, the IFFT transformer 315, the subcarrier mapper 316, the modulator 318, the rate matcher 319, the turbo encoder 320, and the CRC provider 321 have configurations and functions similar to those of the IFFT transformer 215, the subcarrier mapper 216, the modulator 218, the rate matcher 219, the turbo encoder 220, and the CRC provider 221, respectively, in the user equipments 200.

Further, the Layer 2 processor 305 has a configuration and functions similar to those of the Layer 2 processor 205 in the user equipments 200.

The data processing in the Layers 1 and 2 are inversed in terms of the direction, i.e., transmission and reception, in the corresponding data processing in the Layers 1 and 2 in the user equipment 200.

In the base station 300, a signal that undergoes FFT processing by the FFT transformer 307 undergoes processing by the subcarrier demapper 308 to separate data of each user, and demodulation and decoding processing is executed on each user data, for each user.

The IDFT transformer 309 executes SC-FDMA demodulation by executing inverse discrete Fourier transformation processing on data which has been separated on a user basis by the subcarrier demapper 308.

The subcarrier mapper 316 executes data multiplexing processing for each user, on a signal before the IFFT processing by the IFFT transformer 315, whereby executing coding and modulation processing on each user data on the user basis.

The RRC layer processor 306 controls wireless resources and the entire device. For example, the RRC layer processor 206 has an RRC Connection control function to page and establish or release calls, a measurement control function to manage and report measurements, and a mobility control function to control connection switching, such as handovers and reselections, as well as a notification information control function to generate and update notification information.

The Layer 2 processor 305 and the RRC layer processor 306 are connected to nodes upper to the base station 300, for sending and receiving data with a core network. An example of the nodes upper to the base station 300 includes a gateway apparatus.

(1.4) Relay Station 400

As set forth previously, in a wireless communication systems under the LTE-A scheme, an introduction of relay stations 400 that relays wireless signals sent and received between user equipments 200 and base stations 300 has been considered.

The LTE-A scheme has been developed to be compatible with the LTE scheme. Hence, in order for user equipments 200 of the LTE scheme to be capable of connecting to a relay station 400 of the LTE-A scheme, the relay station 400 may be designed such that the user equipment 200 of the LTE scheme do not discriminate a base station 300 of the LTE scheme against an LTE-A relay station 400 (i.e., such that the relay station 400 is handled in the same manner as the base station 300).

Further, there are types of relay stations, namely, amplify and forward (AF) type relay stations that simply amplify and send reception signals; and decode and forward (DF) type relay stations that demodulate, decode data, execute reconstruction of data, such as user multiplexing and separation, and then encode, modulate, and send the reception signals.

In this example, DF type relay stations are used, for example.

Figure 5:
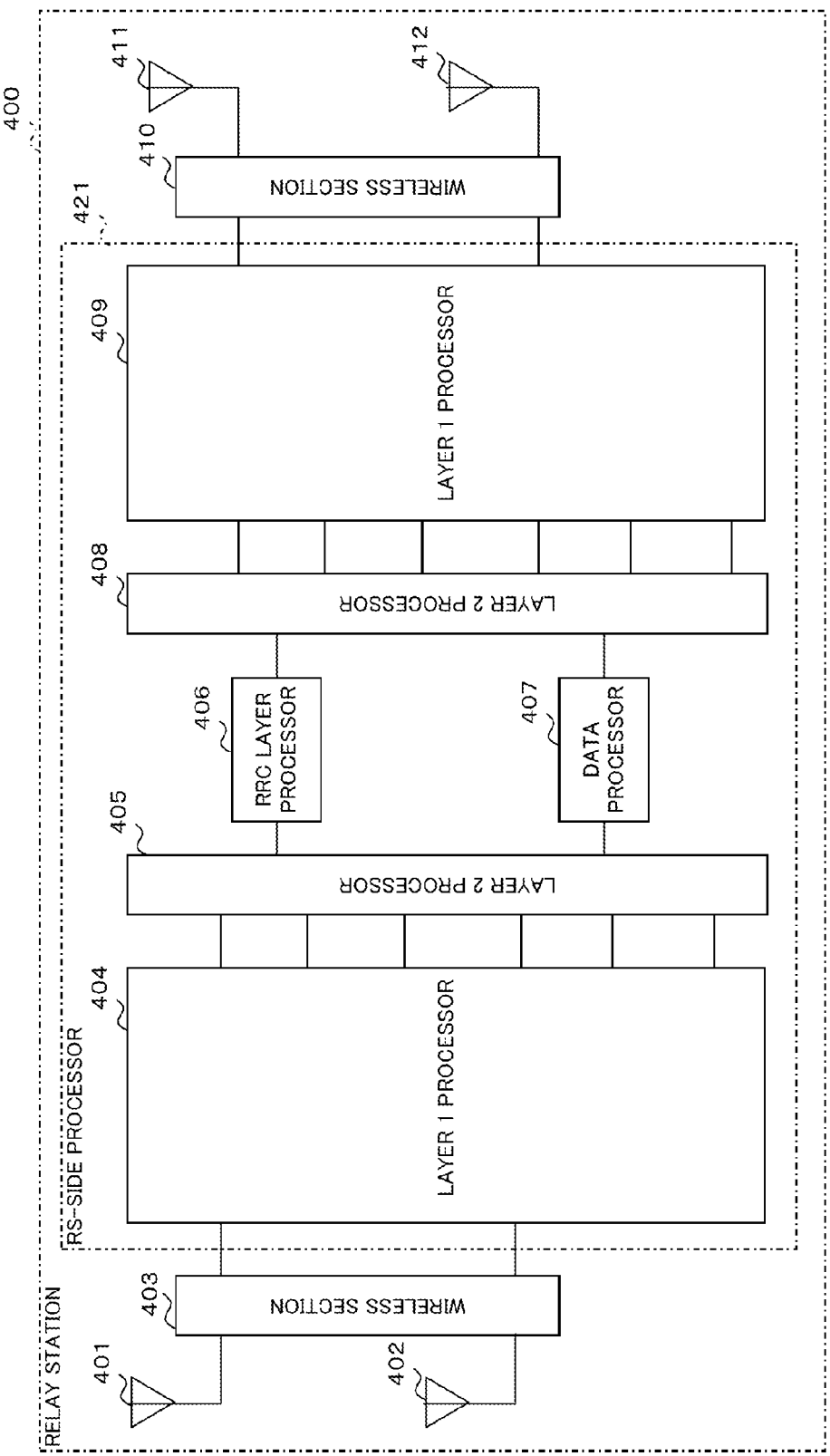
FIG. 5 is a diagram illustrating an example of the configuration of a relay station depicted in FIG. 2.

FIG. 5 is a diagram illustrating an example of the configuration of a relay station 400 in accordance with an embodiment.

The relay station 400 depicted in FIG. 5 includes a UE-side reception antenna 401, a UE-side transmission antenna 402, a wireless section 403, an RS-side processor 421, a wireless section 410, a BS-side transmission antenna 411, and a BS-side reception antenna 412, for example.

Here, the RS-side processor 421 executes various types of processing in the relay station 400. For example, the RS-side processor 421 may function as a first processor that executes reconnection processing with the base station 300, every time a plurality of time durations with respect to certain timing, such as a detection of a relay link error, elapse, for a call corresponding to each time duration.

For that purpose, the RS-side processor 421 includes a Layer 1 processor 404, a Layer 2 processor 405, a RRC layer processor 406, a data processor 407, a Layer 2 processor 408, and a Layer 1 processor 409, for example.

Note that the UE-side reception antenna 401, the UE-side transmission antenna 402, the wireless section 403, the Layer 1 processor 404, and the Layer 2 processor 405 have configurations and functions similar to those of the reception antenna 301, the transmission antenna 302, the wireless section 303, the Layer 1 processor 304, and the Layer 2 processor 305 in the base station 300, respectively.

The Layer 2 processor 408, the Layer 1 processor 409, the wireless section 410, the BS-side transmission antenna 411, and the BS-side reception antenna 412 have configurations and functions similar to those of the Layer 2 processor 205, the Layer 1 processor 204, the wireless section 203, the transmission antenna 201, and the reception antenna 202 in the user equipment 200, respectively.

A connection between the relay station 400 and the user equipments 200 is fundamentally established in the similar manner to a connection between the base station 300 and a user equipment 200, and a connection between the relay station 400 and the base station 300 is fundamentally established in the similar manner to a connection between a user equipment 200 and the base station 300.

The RRC layer processor 406 has the function of the RRC layer processor 206 in a user equipment 200, and the function of the RRC layer processor 306 in the base station 300. For example, the RRC layer processor 406 has a reconnection processing function to switch connections to another base station 300, another cell, or another sector.

Further, the data processor 407 combines data of multiple users relayed from the user equipment 200 to the base station 300, and forwards the combined data to the base station 300 in a batch. In contrast, the data processor 407 divides data relayed from the base station 300 to user equipments 200 for each user data and delivers the divided data to the respective user equipments 200. That is, the data processor 407 reconstructs data within the relay station 400.

Here, as set forth previously, a user equipment 200 monitors the connection status with the base station 300, based on the reception quality of wireless signals. If the reception quality deteriorates to the degree where communications are hindered, and if that status is not overcome within a certain time period, the user equipment 200 determines that an RLF occurs and executes reconnection processing to switch connection to another base station 300, another cell, or another sector.

Similar to the user equipments 200, since the relay station 400 is connected to the base station 300 via the wireless propagation path, the relay station 400 also executes RLF determination processing (hereinafter, referred to as synchronization determination processing) as described above.

Since the relay station 400 may have multiple user equipments 200 with different qualities of services (QoSs) belonging to that station 400, an error as described below may occur when the above-described control in the user equipment 200 is applied to the relay station 400.

Figure 6:
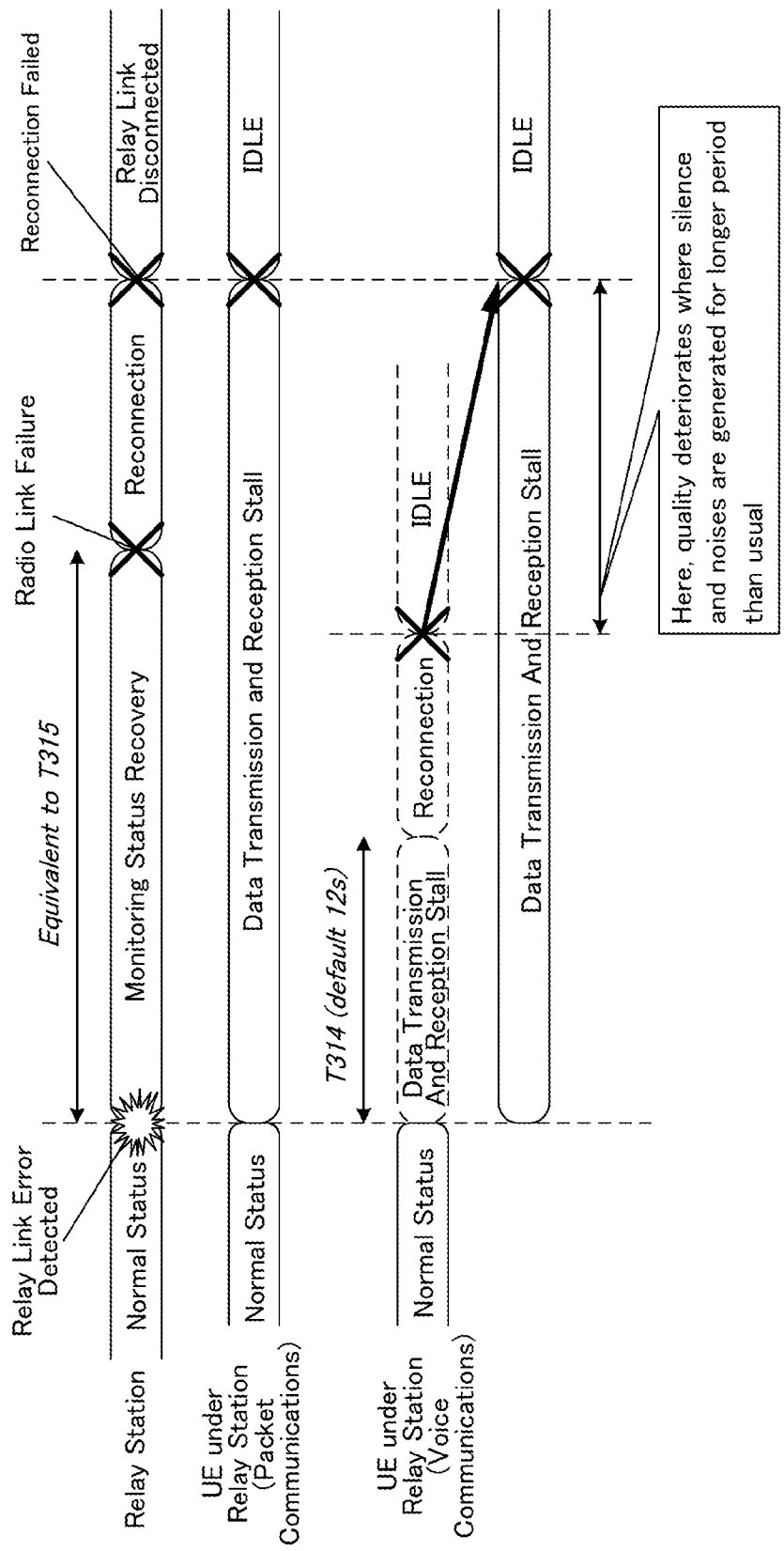
FIG. 6 is a diagram illustrating an example of the operation of the wireless communication system.

FIG. 6 depicts an example where the relay station 400 that has a user equipment 200 making a packet communication call and another user equipment 200 making a voice call, executes the above-described synchronization determination processing for packet communication call. Note that for the sake of brevity of illustration, it is assumed that the respective user equipments 200 recognize that the relay station 400 is always in a normal status (i.e., status where the reception quality level is appropriate) and the user equipments 200 do not detect a link error on the access link with the relay station 400.

As exemplified in FIG. 6, in response to detecting an error on the relay link, the relay station 400 monitors whether the status of the relay link recovers and executes reconnection processing when the status recovery monitoring timer expires. At this time, the upper limit of the status recovery monitoring timer is set to a value of about T315 (180 seconds) for the packet communication call.

After detecting RLF, the relay station 400 tries to reconnect to the base station 300. If the reconnection processing, the relay link with base station 300 is disconnected. Further, any calls relayed by the relay station 400 are also disconnected.

After the detection of the error on the relay link by the relay station 400 to the failure of the reconnection processing, data transmission and reception are stalled in the user equipments 200 under the relay station 400. Accordingly, although the user equipments 200 are not experiencing any link error, the quality of service deteriorates, in the manner similar to when a link error is detected.

At that time, the user equipment 200 making a packet communication call is disconnected from the call in the processing time (T315+reconnection time) that is comparable to the time duration when the user equipment 200 directly connects to the base station 300, detects a link error, and a reconnection fails. Hence, the quality of service is also comparable.

However, the user equipment 200 making a voice call experiences stall of data transmission and reception (i.e., silence) during a time duration longer than when the user equipment 200 directly connects to the base station 300 and executes a reconnection processing, experiencing a worse quality of service.

Hence, irrespective whether the user equipments 200 connect to the base station 300 and the relay station 400, in order to provide uniform quality of service to users, synchronization determination processing is to be executed by the relay station 400 considering the service types used by the user equipments 200 under the relay station 400.

Figure 7:
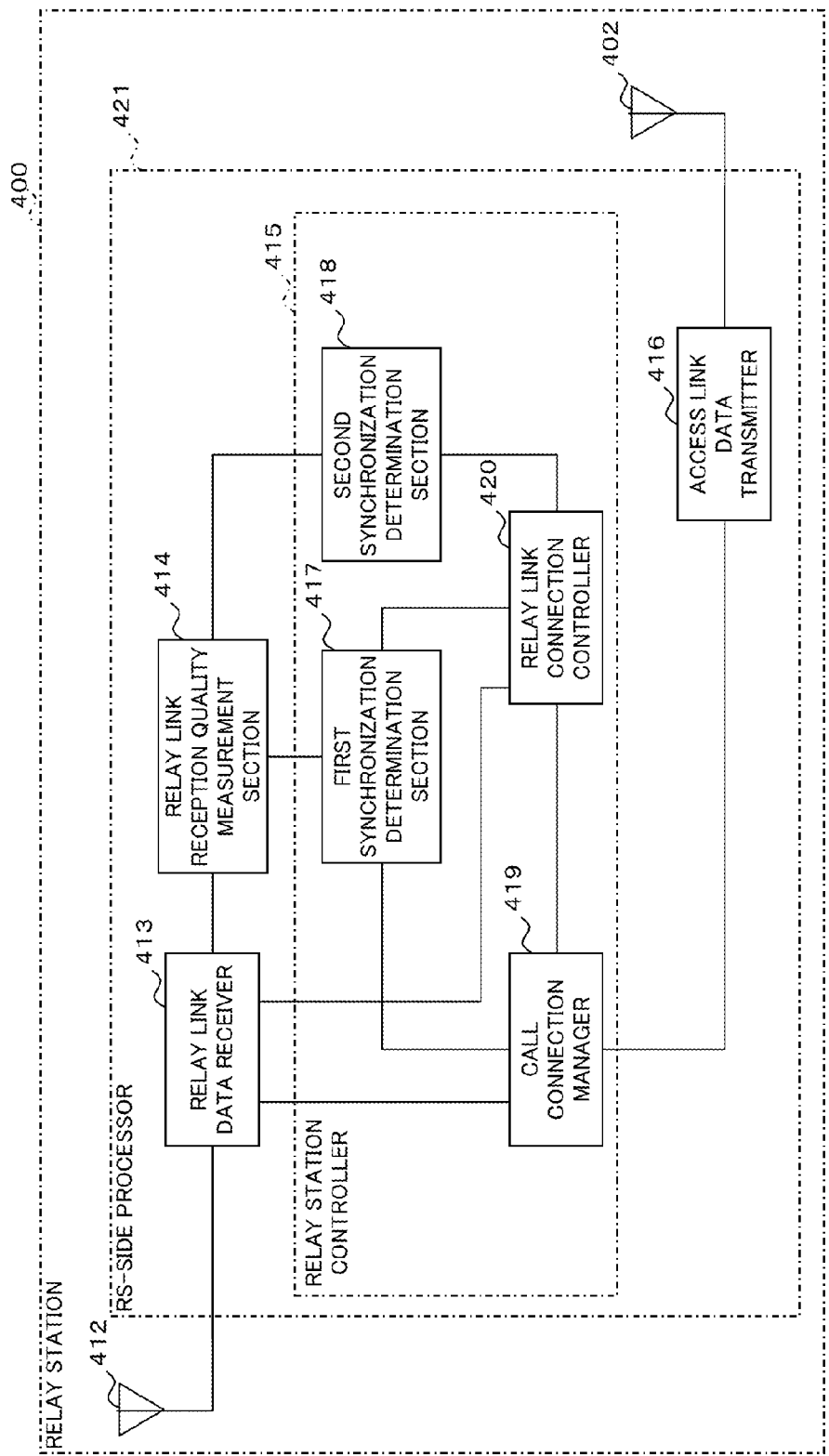
FIG. 7 is a diagram illustrating an example of the configuration of a relay station in accordance with an embodiment.

Here, an example of the configuration of the relay station 400 in accordance with an embodiment is depicted in FIG. 7.

The relay station 400 depicted in FIG. 7 includes a BS-side reception antenna 412, a RS-side processor 421, and a UE-side transmission antenna 402, for example.

Here, the RS-side processor 421 executes various types of processing in the relay station 400. For example, the RS-side processor 421 may function as a first processor that executes reconnection processing with the base station 300, every time a plurality of time durations with respect to certain timing, such as a detection of a link error, elapse, for a call corresponding to each time duration.

For that purpose, the RS-side processor 421 includes a relay link data receiver 413, a relay link reception quality measurement section 414, a relay station controller 415, and an access link data transmitter 416, for example.

Note that the functions of the relay link data receiver 413 and the relay link reception quality measurement section 414 are an example of the function embodied by the Layer 1 processor 409, and the function of the relay station controller 415 is an example of the function embodied by the RRC layer processor 406. Further, the function of the access link data transmitter 416 is an example of the function embodied by the Layer 1 processor 404.

The relay link data receiver 413 receives a signal from the base station 300, executes predetermined reception processing on the signal, and outputs it to the relay station controller 415. The relay link data receiver 413 extracts data used to measure the reception quality from the reception signal, and sends it to the relay link reception quality measurement section 414.

The relay link reception quality measurement section 414 measures and monitors the reception quality of the reception signal, based on the data used to measure the reception quality sent from the relay link data receiver 413. The measurement result by the relay link reception quality measurement section 414 is sent to the relay station controller 415.

The relay station controller 415 controls the link connection in the relay station 400. For that purpose, the relay station controller 415 includes a first synchronization determination section 417, a second synchronization determination section 418, a call connection manager 419, and a relay link connection controller 420, for example.

The first synchronization determination section 417 determines whether a link error occurs on the relay link between the relay station 400 and the base station 300, based on the result of the measurement by the relay link reception quality measurement section 414. Further, the first synchronization determination section 417 monitors whether the status recovers and executes RLF determination processing when a link error is detected.

Specifically for example, in response to detecting an error on the relay link, the first synchronization determination section 417 starts status recovery monitoring timers for each priority of the communication service employed by a user equipment 200, to initiate multiple status recovery monitor processing.

If one of the status recovery monitoring timer values expires and an RLF is detected for a link corresponding to one of the communication services, the relay link connection controller 420 is notified of the result of the detection. Note that the information about priorities of communication services (or the types, QoSs, or the like, of the communication services) for determining the respective timer value for the status recovery monitoring timers may be notified by the call connection manager 419.

The relay link connection controller 420 instructs physical channel settings, such as target frequency, for detecting a cell to reconnect to the relay link data receiver 413, in order to execute reconnection processing, based on the RLF detection result from the first synchronization determination section 417.

Note that the status recovery monitor processing may be continued to be executed even during the reconnection processing by the relay link connection controller 420. In the reconnection processing, a new cell is detected and the reception quality is measured in that new cell. The second synchronization determination section 418 determines whether a synchronization is established in the new cell and reports the result of the determination to the relay link connection controller 420. If the synchronization is established, a connection is made to that new cell. At that time, the relay link connection controller 420 may instruct the first synchronization determination section 417 to stop the status recovery monitor processing and the RLF determination processing.

That is, the second synchronization determination section 418 executes synchronization determination processing on a new cell detected by the cell search function of the relay link data receiver 413.

If the reconnection processing fails, the relay link connection controller 420 may instruct the relay link data receiver 413 to stop receptions in the cell to be detected. Further the relay link connection controller 420 may notify the call connection manager 419 of the reconnection failure.

Here, the call connection manager 419 that is notified of the reconnection failure executes call disconnection processing for the corresponding user equipments 200. For example, the call connection manager 419 generates an RRC Connection Release message (message notifying a call disconnection of a call) as a call disconnection message, and sends that call disconnection message to the user equipments 200 via the access link data transmitter 416 and the UE-side transmission antenna 402.

Further, when a recovery of the status is detected by the first synchronization determination section 417 and any of the timer values expires, the RLF determination processing that is being executed is stopped and notifies the relay link connection controller 420 of the recovery of the link status in order to stop the reconnection processing. The notified relay link connection controller 420 may stop the reconnection processing that is being executed.

The relay station 400 then repeats the series of processing described above as long as any of the status recovery monitoring timers is working (any of the timer values does not expire), for example. If all of the status recovery monitoring timers stop due to time out and the reconnection processing fails, calls of all of the user equipments 200 that are communicating and belong to the relay station 400 are disconnected and the access link between the relay station 400 and the base station 300 is disconnected.

The call connection manager 419 recognizes and manages which user equipments 200 are connected under the relay station 400. For example, the call connection manager 419 can recognizes and manages the priorities, service types, QoSs of the communication services used by the user equipments 200.

Figure 11:
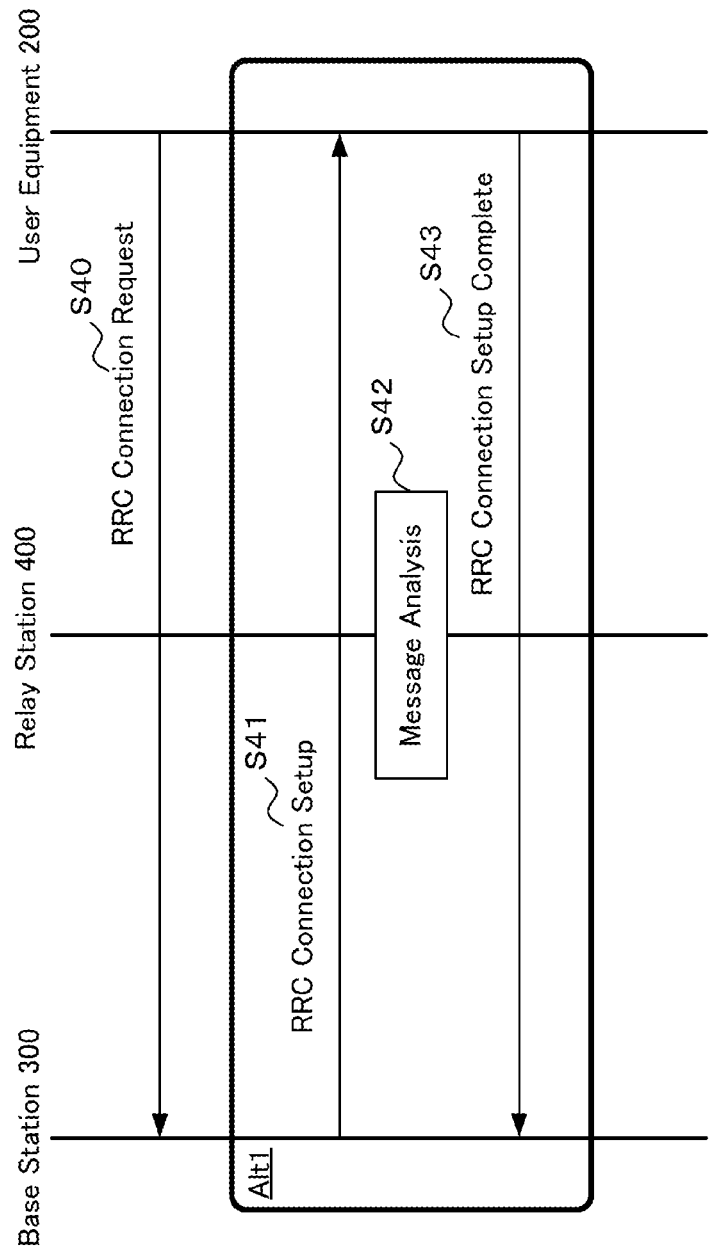
FIG. 11 is a diagram illustrating an example of how the QoS is obtained in the relay station.

Note that information about the communication service used by the user equipments 200 (e.g., the priority, service type, and QoS) may be obtained appropriate parameter by analyzing relayed messages while relaying communications between the base station 300 and the user equipments 200, as exemplified in FIG. 11 (refer to obtainment pattern Alt1 in FIG. 11).

More specifically, when a connection request message (RRC Connection Request) is sent from a user equipment 200 to the base station 300 (Step S 40), a connection instructing message (RRC Connection Setup) is issued from the base station 300 to the user equipment 200 (Step S 41).

At that time, the relay station 400 extracts information about the communication service contained in the connection instructing message, and analyzes it, for example (Step S 42). The call connection manager 419 is notified of the obtained information about the communication service.

A connection completed message (RRC Connection Setup Complete) is sent from the user equipment 200 back to the base station 300 (Step S 43), and the call connection sequence is completed when the base station 300 recognizes that connection completed message.

Figure 12:
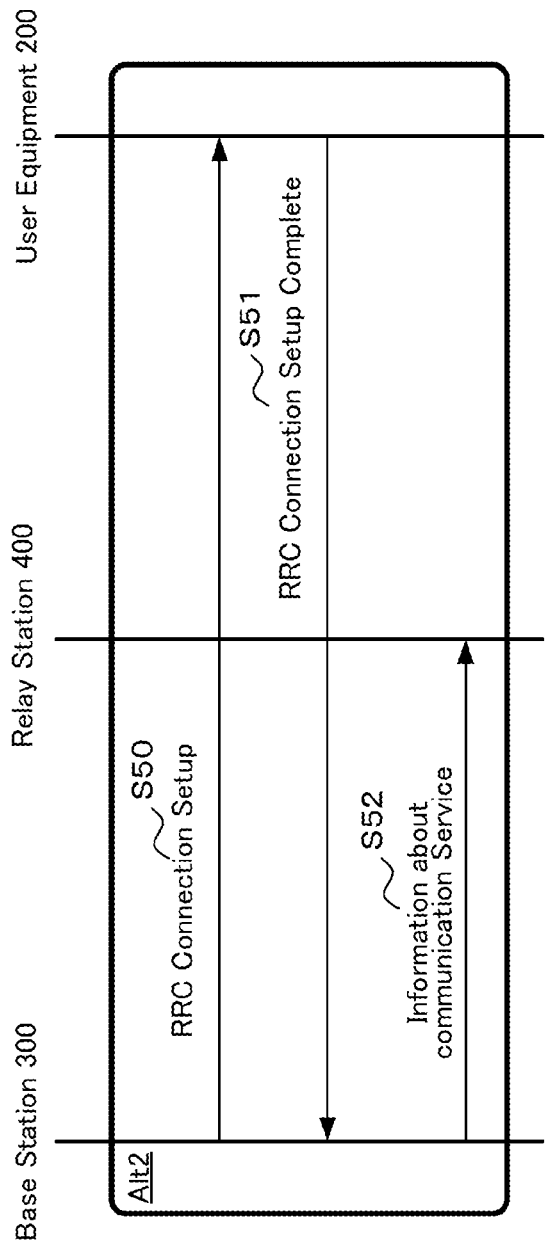
FIG. 12 is a diagram illustrating an example of how the QoS is obtained in the relay station.

Alternatively, the information about the communication service of the user equipment 200 (e.g., the priority, service type, and QoS) may be notified from the base station 300 after the call connection sequence between the base station 300 and the user equipments 200 is completed, as exemplified in FIG. 12 (obtainment pattern Alt2 in FIG. 12).

More specifically, when a connection request message (RRC Connection Request) is sent from a user equipment 200 to the base station 300, a connection instructing message (RRC Connection Setup) is issued from the base station 300 to the user equipment 200 (Step S 50).

A connection completed message (RRC Connection Setup Complete) is sent from the user equipment 200 back to the base station 300 (Step S 51), and the call connection sequence is completed when the base station 300 recognizes that connection completed message.

Thereafter, the information about the communication service is notified from the base station 300 to the relay station 400 (Step S 52).

Further, the access link data transmitter 416 sends data to the user equipments 200 via the UE-side transmission antenna 402. For example, the access link data transmitter 416 may encode and modulate the data of the call disconnection message and notifies the user equipments 200 of it.

As set forth above, upon occurrence of a relay link error, the relay station 400 can disconnect each call of a user equipment 200 at the timing suitable for the priority of the communication service used by that user equipment 200. Hence, the quality of service being provided to the user equipment 200 is maintained to the level comparable to the level achieved when the user equipment 200 directly connects to the base station 300.

(1.5) Example of Operation of Relay Station 400

Here, a processing flow as an example of the above-described relay station 400 will be described with reference to FIG. 8.

Figure 8:
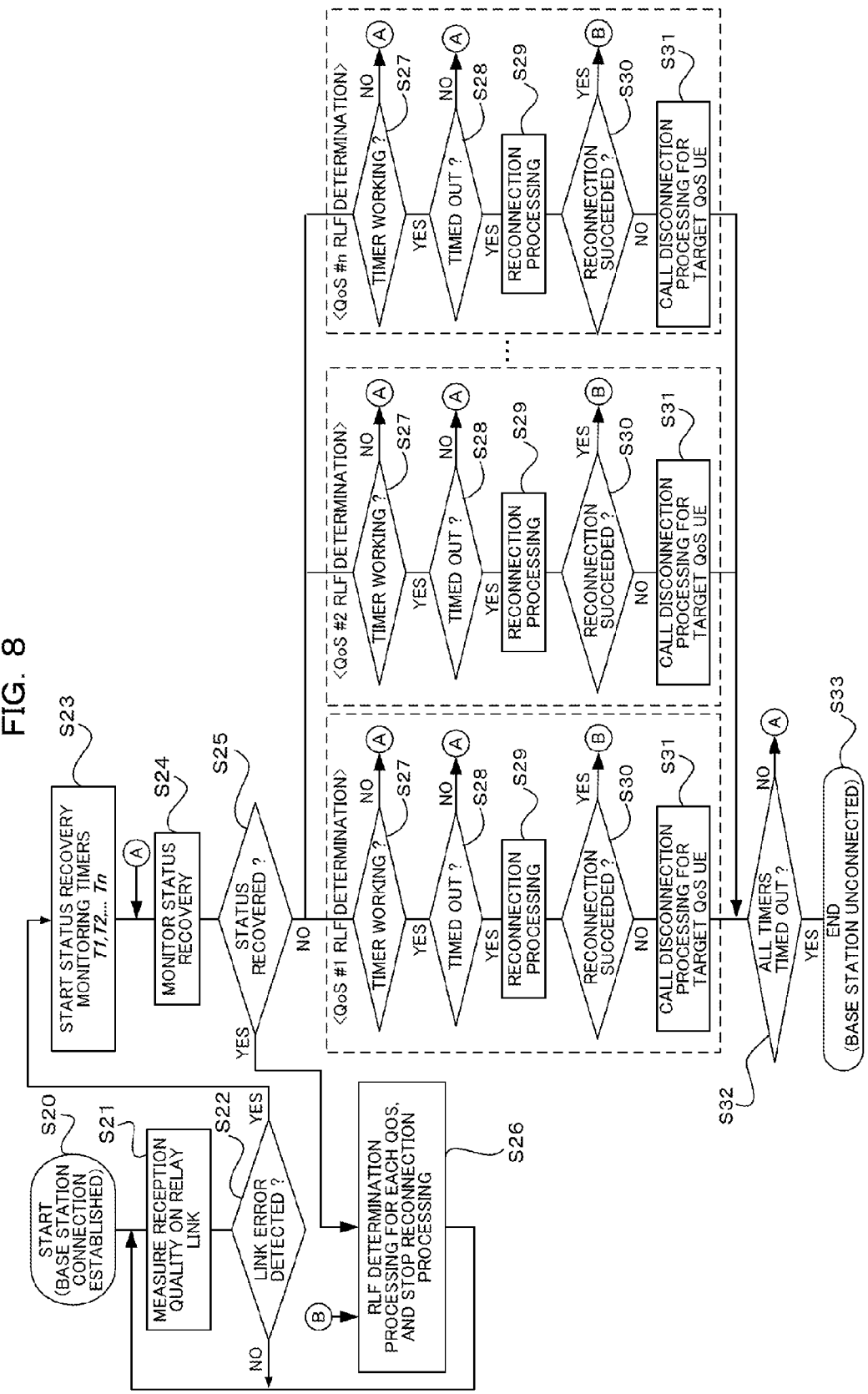
FIG. 8 is a diagram illustrating an example of a method of controlling the relay station in accordance with an embodiment.

As depicted in FIG. 8, once the relay station 400 establishes a connection of the relay link with the base station 300 (Step S 20), the relay station 400 measures the reception quality on the relay link between the relay station 400 and the base station 300 at regular or irregular intervals (Step S 21). Note that the reception quality may be measured by measuring the signal-to-interference ratio (SIR) or the peak signal-to-noise ratio (PSNR) on the relay link, for example. The relay station 400 then compares the measured reception quality against a predetermined threshold level, and detects that a link error occurs if the reception quality is smaller than the predetermined threshold level (Step S 22). Note that the relay station 400 may detect that a link error occurs if the reception quality exceeds another threshold level that is greater than the predetermined threshold level, for example.

Then, if no link error is detected (the NO route from Step S 22), the relay station 400 repeats the processing in Steps S 21 and S 22.

In contrast, if an link error is detected (the YES route from Step S 22), the relay station 400 starts multiple status recovery monitoring timers $T_1$ to $T_n$ (n is an integer of 2 or greater)

corresponding to the priorities (or the service types, QoSs, or the like) of the communication services used by the user equipments 200, in order to monitor whether the link error status is not recovered (Step S 23). More specifically, the RS-side processor 421 can set respective time durations from when the relay station 400 detects an error status on the relay link to when an occurrence of an RLF, based on the priorities of communication services used by the user equipments 200.

For example, status recovery monitoring timers $T_1$ to $T_n$ are used in number corresponding to the number of the types of priorities of the communication services used by the user equipments 200, and different timer values are set to the timers. Alternatively, a single timer may be used by setting, to that timer, the difference between the respective timer values when the respective timers time out. Further, although the values of the timers satisfy the relationship $T_1<T_2<\ldots<T_n$ in this example, different values may be set to the timers. The respective status recovery monitoring timers independently function, and they are not stopped until the times expire, the link status recovers, or the reconnection processing succeeds. In the example depicted in FIG. 8, the status recovery monitoring timers $T_1$ to $T_n$ corresponding to QoS #1, QoS #2, ..., QoS #n.

The relay station 400 then monitors whether or not the status of the relay link recovers (Step S 24). For example, the relay station 400 may compare the measured reception quality against the predetermined threshold level, and monitor whether or not the reception quality is equal to or greater than the predetermined threshold level. Note that that the monitoring is continued until the link error status recovers, reconnection processing succeeds, or all of the n status recovery monitoring timers expire.

The relay station 400 then determines whether or not the status of the relay link recovers (Step S 25). Here, if a recovery of the relay link status is detected (the YES route from Step S 25), the relay station 400 stops RLF determination processing and reconnection processing for the respective service types of the user equipments 200 (Step S 26). The flows then transitions to Step S 21.

More specifically, when the relay link recovers from the error status, the RS-side processor 421 may stop each reconnection processing. This can help to reduce the processing load of the relay station 400.

In contrast, when the status of the relay link does not recover (the NO route from Step S 25), the relay station 400 executes RLF determination processing (synchronization determination processing) for the respective service types (QoS #1 to QoS #n) of the user equipments 200, based on the multiple status recovery monitoring timers $T_1$ to $T_n$ corresponding to the respective service types of the user equipments 200.

Here, focusing on RLF determination processing on QoS #1, the relay station 400 determines whether the timer $T_1$ is working and does not expire (Step S 27). If it is determined that the timer $T_1$ is not working or expires (the NO route from Step S 27), the relay station 400 transitions to the processing in Step S 24 (refer to reference symbol A) where the relay station 400 monitors whether the status of the relay link recovers. If the status of the relay link recovers before any of the times expires, the relay station 400 may stop RLF determination processing for each QoS and transitions to a normal communication status, for example.

In contrast, if it is determined that the timer $T_1$ is working and does not expire (the YES route from Step S 27), the relay station 400 determines whether the timer $T_1$ times out (the timer expires) (Step S 28). If it is determined that the timer $T_1$ does not time out (the timer does not expire) (the NO route from Step S 28), the relay station 400 transitions to the processing in Step S 24 (refer to reference symbol A) where the relay station 400 monitors whether the status of the relay link recovers.

Here, if it is determined that the timer $T_1$ is timed out (the timer expires) (the YES route from Step S 28), the relay station 400 detects an occurrence of an RLF and executes reconnection processing to switch the connection to another base station 300, another cell, another sector, or the like (Step S 29). Even when reconnection processing is being executed, whether the status of the relay link recovers can be monitored in parallel, as long as any timer does not expire and is still working.

The relay station 400 then determines whether or not the reconnection processing succeeds (Step S 30). If it is determined that the reconnection processing succeeds (the YES route from Step S 30), the flow transitions to Step S 26 (refer to reference symbol B). In contrast, if it is determined that the reconnection processing fails (the NO route from Step S 30), the relay station 400 disconnects a call with a user equipment 200 corresponding to QoS #1 and terminates the communication (Step S 31). For example, the relay station 400 may send a message notifying a call disconnection of the corresponding call, to the user equipment 200, through the transmission antenna 402.

That is, the transmission antenna 402 functions as an example of a transmitter that, if the relay station 400 is not capable of reconnecting with the base station 300 until a predetermined time elapses after a start of the reconnection processing for the call corresponding to the status recovery monitoring timers $T_1$ to $T_n$, sends a message to the user equipment 200 for notifying a call disconnection of the corresponding call in response to the lapse of the predetermined time.

When receiving the call disconnection message described above from the relay station 400 through the reception antenna 201, the user equipments 200 executes call disconnection processing on the corresponding call by the UE-side processor 222, in response to that call disconnection message being received. After terminating the communication, the user equipments 200 may transition to the reception standby status, for example.

The relay station 400 independently executes processing in the above-described Steps S 27 to S 31 for each QoS, and determines whether or not all of the status recovery monitoring timers time out (Step S 32). If it is determined that all of the status recovery monitoring timers do not time out (the NO route from Step S 32), the relay station 400 transitions to the processing in Step S 24 (refer to reference symbol A) where the relay station 400 monitors whether the status of the relay link recovers.

In contrast, if it is determined that all of the status recovery monitoring timers time out (the YES route from Step S 32), the relay station 400 disconnects the connection with the base station 300 and terminates the communication (Step S 33). At that time, the relay link is completely disconnected, and the relay station 400 does not connect to the base station 300. Hence, the user equipments 200 are in the status similar to the status where they are out of the communication service area. If any of the times remains working, the relay station 400 can continue executing the RLF determination processing for each QoS.

Note that the RLF determination processing and the reconnection processing described above may be executed by the relay station 400 independently for each QoS. Alternatively, whether or not the status recovers may be monitored for all of the QoSs.

As set forth above, in this example, the relay station 400 executes multiple RLF determination processing in accordance with the service types of the user equipments 200. Hence, even when an error is detected on the relay link, calls of the user equipments 200 can be disconnected at the timing appropriate for each QoS, for example. Consequently, the qualities of services provided to the user equipments 200 can be maintained at the level similar to that of when the user equipments 200 connect to the base station 300.

For example, consider an example where user equipments 200 of multiple different service types (QoS #1 to QoS #n) are connecting to the relay station 400.

Figure 9:
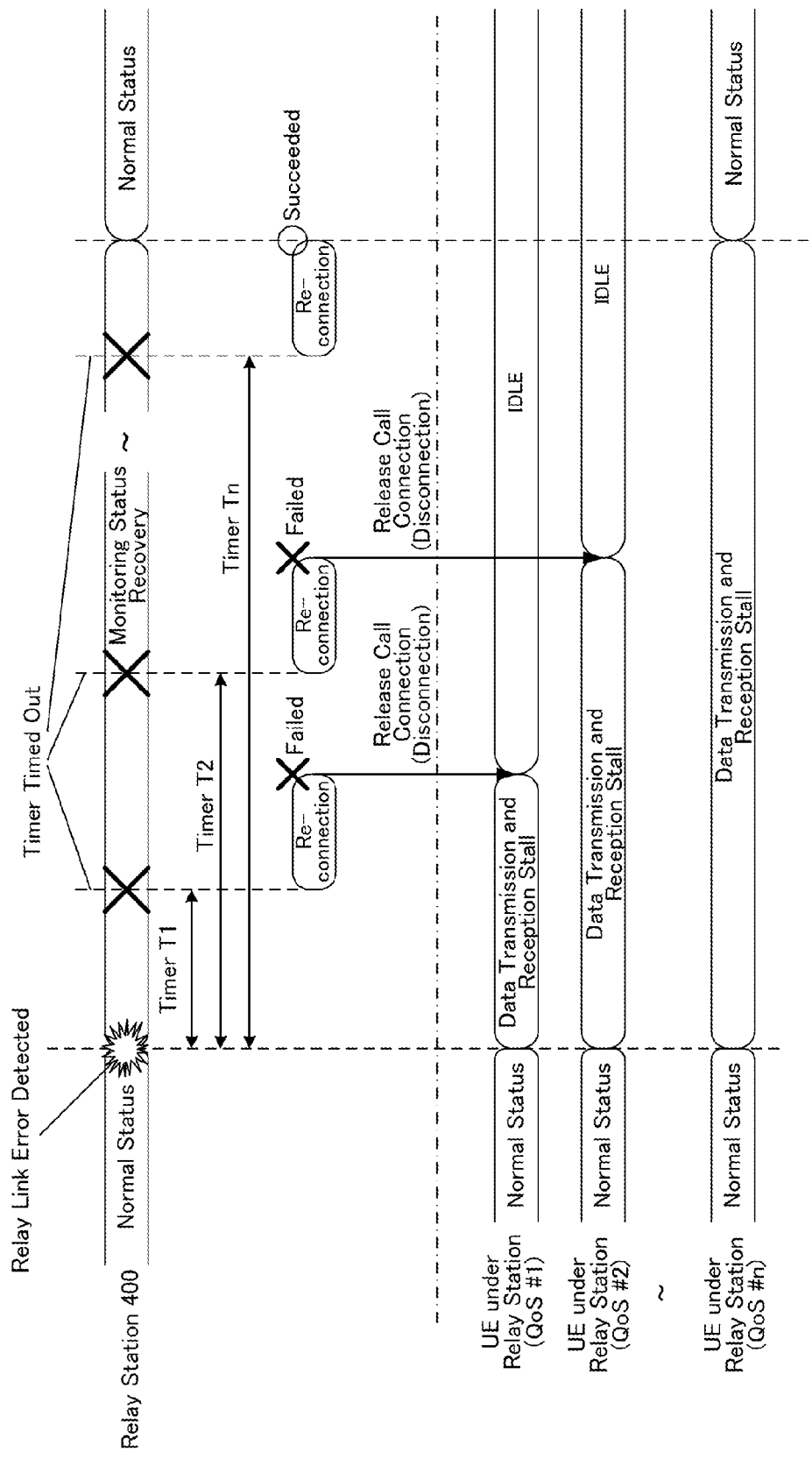
FIG. 9 is a diagram illustrating an example of the operation of a wireless communication system in accordance with an embodiment.

In such an example, as exemplified in FIG. 9, once the relay station 400 detects an error on the relay link, the relay station 400 starts status recovery monitoring timers $T_1$ to $T_n$ corresponding to the service types of the user equipments 200.

When the status recovery monitoring timer $T_1$ corresponding to QoS #1 times out (expires), the relay station 400 detects an RLF and executes reconnection processing to another cell or the like. At that time, if the reconnection processing fails, the relay station 400 executes a call disconnection (release) processing for a user equipment 200 under the relay station 400 which is using the service QoS #1.

Thereby, the user equipment 200 under the relay station 400 which is using the service QoS #1 can terminate the communication and transition to the reception standby status, when the upper limit of the timer $T_1$ and the time required for the reconnection processing elapse after when the error on the relay link is detected.

Thereafter, when the status recovery monitoring timer $T_2$ corresponding to QoS #2 times out (expires), the relay station 400 detects an RLF and executes reconnection processing to another cell or the like. At that time, if the reconnection processing fails, the relay station 400 executes a call disconnection (release) processing for a user equipment 200 under the relay station 400 which is using the service QoS #2.

Thereby, the user equipment 200 under the relay station 400 which is using the service QoS #2 can terminate the communication and transition to the reception standby status, when the upper limit of the timer $T_2$ and the time required for the reconnection processing elapse after when the error on the relay link is detected.

Thereafter, the relay station 400 sequentially executes similar processing for user equipments 200 of other service types.

When the status recovery monitoring timers $T_n$ corresponding to QoS #n times out (expires), the relay station 400 detects an RLF and executes reconnection processing to another cell or the like. At that time, if the reconnection processing succeeds, a user equipment 200 under the relay station 400 which is using the service QoS #n can continue communicating with the base station 300.

As set forth above, even when an error is detected on the relay link, calls of the user equipments 200 can be disconnected at the timing appropriate for each QoS. Consequently, the qualities of services provided to the user equipments 200 can be maintained at the level similar to that of when the user equipments 200 connect to the base station 300.

(2) Description of First Variant

In the above-described embodiment, the relay station 400 executes RLF determination processing in the number corresponding to the number of the service types used by user equipments 200. For example, the relay station 400 can simplify the connection control by simplifying the managements of QoS.

For example, as depicted in FIG. 10, four services are provided in a certain a wireless communication system 100, namely, the Voice over Internet Protocol (VoIP), the Video Streaming, the File Transfer Protocol (FTP), and the Hypertext Transfer Protocol (HTTP).

In the above-described embodiment, for example, the relay station 400 allocates groups QoS #1, QoS #2, QoS #3, and QoS #4 to the services, respectively, and executes RLF determination processing for each group. Here, the priorities of the QoSs satisfy QoS #1>QoS #2>QoS #3>QoS #4, for example.

In this case, since the RLF determination processing and the reconnection processing are execute for each QoS group, four procedures at maximum are executed until a disconnection of the relay link is completed. The processing load of the relay station 400 is increased by the reconnection processing, reducing the number of reconnection processing to be executed is preferred.

Therefore, instead of executing the RLF determination processing and the reconnection processing for each QoS group, in this example, the call connection manager 419 defines larger groups made from multiple QoSs and the relay station controller 415 executes the RLF determination processing and the reconnection processing described above for each of such groups.

More specifically, the RS-side processor 421 can allocate priorities of communication services used by the user equipments 200 to multiple groups, in number that is smaller than the number of the types of the priorities, and can sets values to status recovery monitoring timers $T_1$ to $T_n$ based on the priorities of those multiple groups.

In the example depicted in FIG. 10, QoS #1 is allocated to a group of the VoIP and the Video Streaming, while QoS #3 is allocated to another group of the FTP and the HTTP. The usability of users can be maintained by setting QoSs based on the service type having the highest QoS in each QoS group.

Note that the number of the groups and the number of the service types in a single group may be set to any values. For example, in the example depicted in FIG. 10, service types are evenly allocated to the two groups. However, QoS #1 may be allocated to the VoIP, QoS #2 may be allocated to the Video Streaming, and QoS #3 may be allocated to the two service types, i.e., the FTP and the HTTP. As described above, the priority of each group may be set to the highest priority among the priorities in that group.

Further, in the example depicted in FIG. 10, multiple service types are allocated to a single group. Alternatively, a single service type may be divided into multiple groups, for example. For example, QoS groups may be created in number of the user equipments 200 using the VoIP, and different QoS groups may be allocated to the respective user equipments 200. Although this increases the load of the relay station 400, connections can be managed more precisely.

(3) Description of Second Variant

Alternatively, in addition to monitoring the operation of the relay station 400, the base station 300 may also manage user equipments 200 under the relay station 400.

For example, the base station 300 determines that a connection with the relay station 400 is disconnected when a certain time elapses after communications with the relay station 400 was lost, and the base station 300 updates network manage information about the user equipments 200 under the relay station 400.

The base station 300 determines a connection or disconnection with the relay station 400. Hence, the base station 300 can make the relay station 400 send fixed pattern data at regular intervals, and determine a disconnection if the fixed pattern data cannot be received normally.

When the base station 300 determines that a connection with the relay station 400 is disconnected, the base station 300 may set a time for permitting reconnection processing from the relay station 400. Here, since the maximum time for reconnection processing by the relay station 400 is dependent on the QoSs of user equipments 200 under the relay station 400, the base station 300 also sets the permitted time for reconnection processing considering the QoS of the user equipments 200. For example, the permitted time for the reconnection processing may be set to a time until the longest status recovery monitoring timer value elapses plus the time required for the reconnection processing after the relay station 400 detects an RLF on the relay link.

Figure 13:
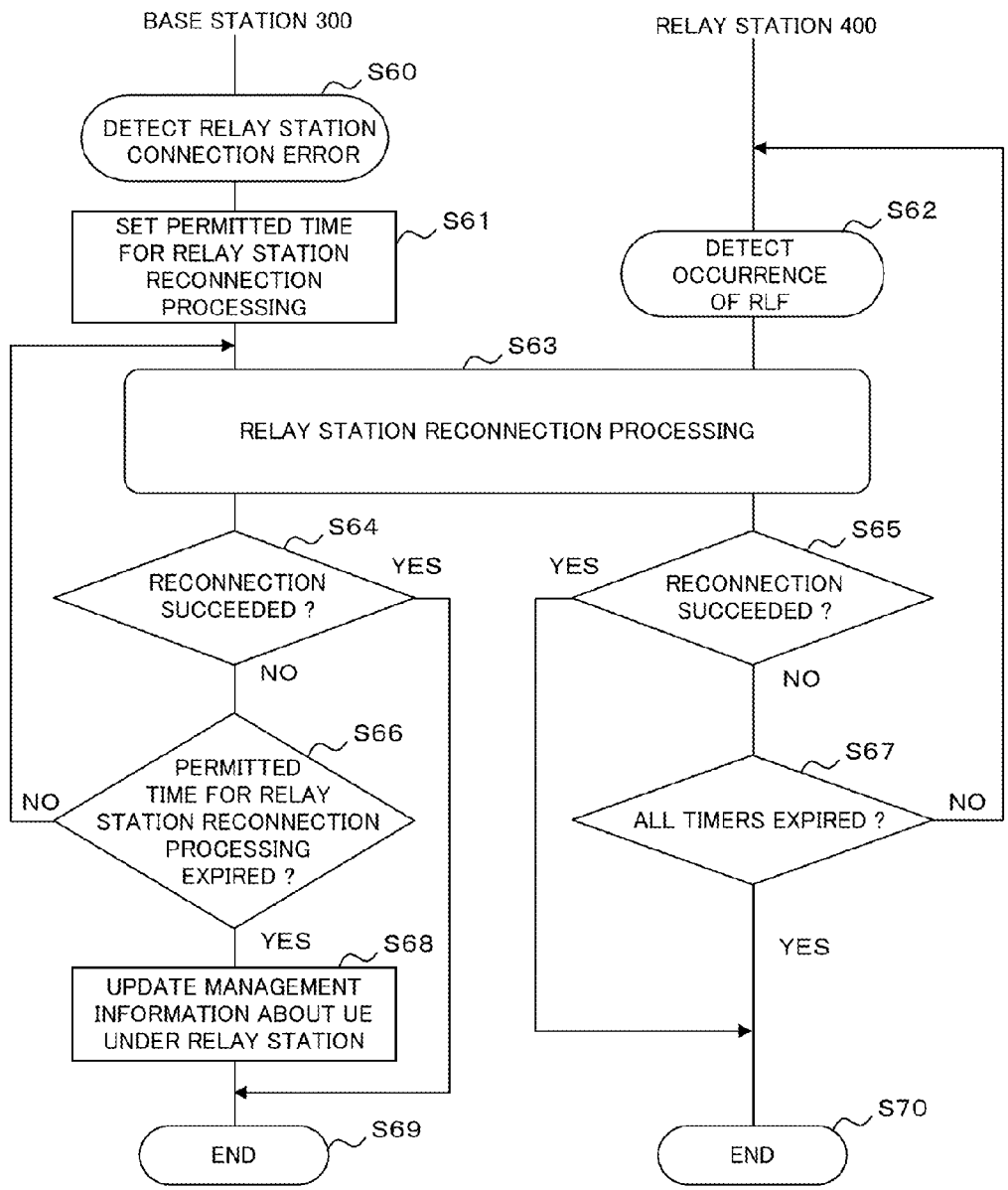
FIG. 13 is a diagram illustrating an example of the operation of a wireless communication system in accordance with an embodiment.

Here, an example of the reconnection processing sequence by the relay station 400 is depicted in FIG. 13.

As depicted in FIG. 13, when the relay station 400 detects an RLF on the relay link (Step S 62), the relay station 400 initiates reconnection processing with the base station 300 (Step S 63).

On the other hand, when the base station 300 detects that the communication with the relay station 400 was lost (Step S 60), the base station 300 sets a permitted time for reconnection processing from the relay station 400 (Step S 61) and waits for a reconnect request from the relay station 400. The permitted time for reconnection processing is set considering the service types (QoSs) used by user equipments 200 under the relay station 400.

Figure 14:
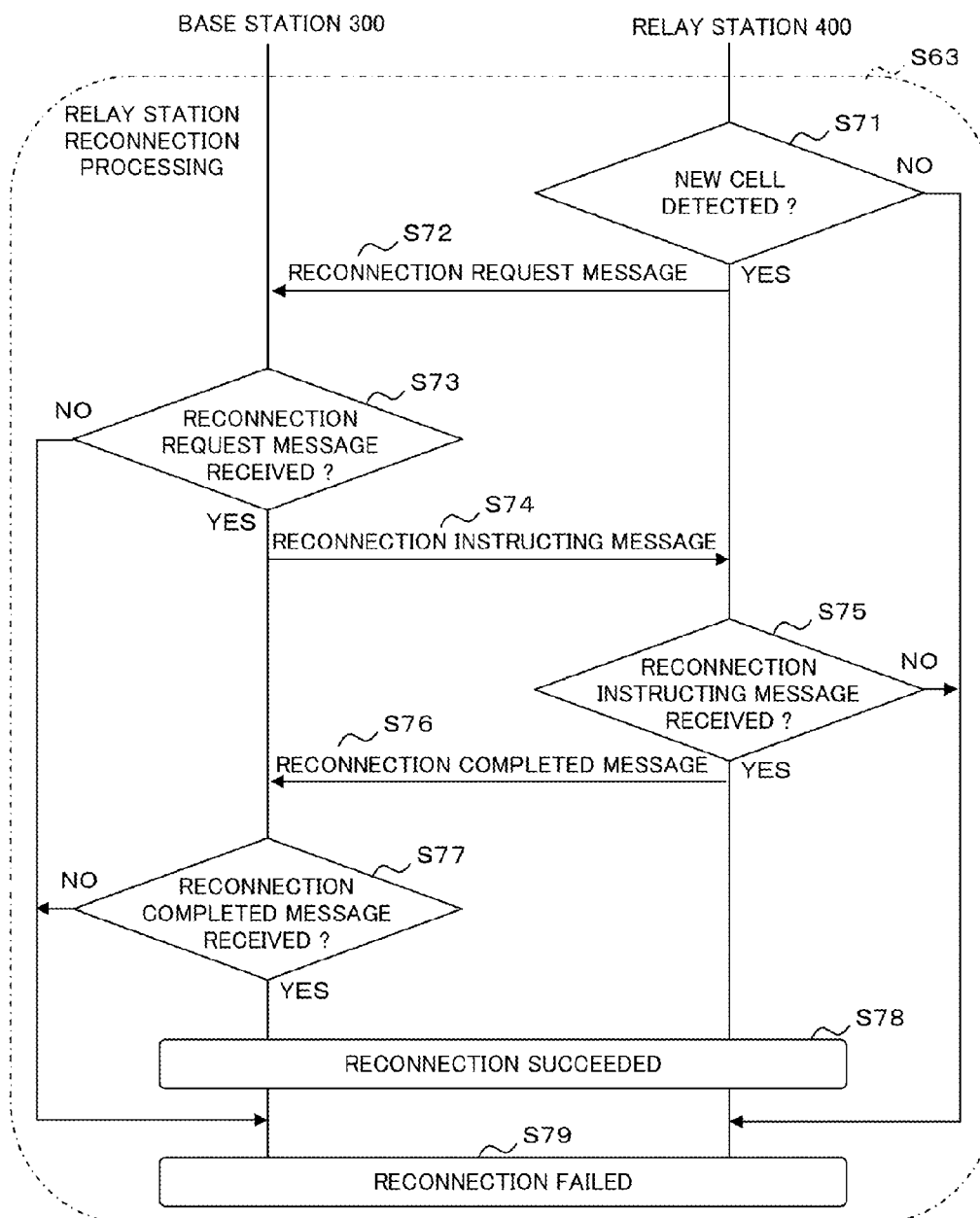
FIG. 14 is a diagram illustrating an example of the operation of a wireless communication system in accordance with an embodiment.

Here, an example of the reconnection processing is depicted in FIG. 14.

As depicted in FIG. 14, the relay station 400 determines whether or not a new cell is detected (Step S 71). If it is determined that no new cell can be detected by the relay station 400 (the NO route from Step S 71), the reconnection processing fails (Step S 79).

In contrast, if the relay station 400 detects a new cell (the YES route from Step S 71), the relay station 400 sends a reconnect request message (RRC Connection Re-establishment Request) to the base station 300 (Step S 72).

The base station 300 determines whether or not a reconnect request message is received from the relay station 400 (Step S 73). If so (the YES route from Step S 73), the base station 300 sends a reconnection instructing message (RRC Connection Re-establishment) to the relay station 400 (Step S 74). If it is determined that a reconnect request message is not received from the relay station 400 (the NO route from Step S 73), the reconnection processing fails (Step S 79).

The relay station 400 determines whether or not a reconnection instructing message is received from the base station 300 (Step S 75). If so (the YES route from Step S 75), the relay station 400 sends a reconnection completed message (RRC Connection Re-establishment Complete) to the base station 300 (Step S 76). If it is determined that a reconnection instructing message is not received from the base station 300 (the NO route from Step S 75), the reconnection processing fails (Step S 79).

The base station 300 determines whether or not a reconnection completed message is received from the relay station 400 (Step S 77). If so (the YES route from Step S 77), the reconnection processing succeeds (Step S 78). Once the reconnection succeeds, the relay station 400 and the user equipments 200 under that relay station 400 can continue communicating. If it is determined that a reconnection completed message is not received from the relay station 400 (the NO route from Step S 77), the reconnection processing fails (Step S 79).

Referring back to FIG. 13, the base station 300 and the relay station 400 determine whether or not the reconnection processing succeeds (Steps S 64 and S 65). If it is determined that the reconnection processing succeeds (the YES route from Steps S 64 and S 65), the above-described procedure completes (Steps S 69 and S 70).

In contrast, if it is determined that the reconnection processing fails (the NO route from Step S 65), the relay station 400 determines whether or not all of the status recovery monitoring timers expire (Step S 67). If there remains any status recovery monitoring timer that is working (the NO route from Step S 67), the above-described reconnection processing is repeatedly execute. If it is determined that all of the status recovery monitoring timers expire (the YES route from Step S 67), the relay station 400 terminates the above-described procedure (Step S 70).

Further, if it is determined that the reconnection processing fails (the NO route from Step S 64), the base station 300 determines whether or not the permitted time for the reconnection processing expires (Step S 66). If it is determined that the permitted time for the reconnection processing does not expire (the NO route from Step S 66), the base station 300 waits for a reconnect request message from the relay station 400.

In contrast, if it is determined that the permitted time for the reconnection processing expires (the YES route from Step S 66), the base station 300 determines that the reconnection fails and the connection with the network is lost. The base station 300 then clears network management information about the relay station 400 and the user equipments 200 under that relay station 400, updates the user equipment management information managed by the base station 300 (Step S 68), and terminates the above-described procedure (Step S 69).

As set forth above, the base station 300 does not permit reconnection processing from the relay station 400 if the permitted time for the reconnection processing elapses. Accordingly, the processing load in the base station 300 can be reduced and effective operations can be achieved.

(4) Miscellaneous

Note that the configurations and functions of the base station 300, the user equipments 200, and the relay station 400 in an embodiment described above may be omitted or may be combined where appropriate. In other words, the configurations and functions described above may be appropriately selected or combined together such that the functions of the present invention are achieved.

For example, the timeout values of the status recovery monitoring timers are determined based on the priorities of services used by the user equipments 200, and examples of the indicators of priorities of services include the qualities of services (QoSs) and the service types. Further, the priorities of the services may be determined based on header contents and data contents included in packet data, for example.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:
1. A wireless communication system comprising:
a base station;
a user equipment; and a relay station that relays a wireless signal sent and received between the base station and the user equipment, wherein the relay station comprises:
a first processor that assigns priorities of communication services employed by the user equipment to a plurality of groups, the number of the plurality of groups being smaller than the number of types of the priorities, sets time durations based on a priority of the plurality of groups, and executes reconnection processing with the base station, every time a plurality of time durations with respect to certain timing elapse, for a call corresponding to each time duration; and a transmitter that, if the relay station is not capable of reconnecting with the base station until a predetermined time elapses after a start of the reconnection processing for the call corresponding to the each time duration, sends a message to the user equipment for notifying a call disconnection of the corresponding call in response to the lapse of the predetermined time, and the user equipment comprises:
a receiver that receives the message sent from the relay station; and a second processor that executes call disconnection processing on the corresponding call in response to the message being received.

2. The wireless communication system according to claim 1, wherein the priority assigned to each of the plurality of groups corresponds to a highest priority among the priorities assigned to communication services within the group.

3. The wireless communication system according to claim 1, wherein each time duration with respect to the certain timing is a time duration from a detection of an error of a status of a wireless communication segment to the base station to which the relay station is connecting, to an occurrence of a radio link failure (RLF).

4. The wireless communication system according to claim 1, wherein, in response to a recovery from an error of a status of a wireless communication segment to the base station to which the relay station is connecting, the first processor stops the reconnection processing for the call corresponding to the each time duration.

5. The wireless communication system according to claim 1, wherein, once the predetermined time elapses after lapse of the longest time duration among the plurality of time durations with respect to the certain timing, the base station does not permit the reconnection processing.

6. The wireless communication system according to claim 1, wherein the first processor sets time durations based on priorities of communication services employed by the user equipment.

7. A relay station that relays a wireless signal sent and received between a base station and a user equipment, the relay station comprising:
a processor that assigns priorities of communication services employed by the user equipment to a plurality of groups, the number of the plurality of groups being smaller than the number of types of the priorities, the processor sets time durations based on a priority of the plurality of groups and executes reconnection processing with the base station, every time a plurality of time durations with respect to certain timing elapse, for a call corresponding to each time duration; and a transmitter that, if the relay station is not capable of reconnecting with the base station until a predetermined time elapses after a start of the reconnection processing for the call corresponding to the each time duration, sends a message to the user equipment for notifying a call disconnection of the corresponding call in response to the lapse of the predetermined time.

8. The relay station according to claim 7, wherein the priority of each of the plurality of group corresponds to a highest priority among the priorities assigned to the communication services within the group.

9. The relay station according to claim 7, wherein each time duration with respect to the certain timing is a time duration from a detection of an error of a status of a wireless communication segment to the base station to which the relay station is connecting, to an occurrence of a radio link failure (RLF).

10. The relay station according to claim 7, wherein, in response to a recovery from an error of a status of a wireless communication segment to the base station to which the relay station is connecting, the processor stops the reconnection processing for the call corresponding to the each time duration.

11. The relay station according to claim 7, wherein the processor sets time durations based on priorities of communication services employed by the user equipment.

12. A user equipment that sends and receives a wireless signal to and from a base station via a relay station, the user equipment comprising:
a receiver that receives a message that is sent from the relay station, if the relay station is not capable of reconnecting with the base station until a predetermined time elapses after a start of reconnection processing, every time a plurality of time durations with respect to the certain timing elapse, for a call corresponding to each time duration, the message notifying a call disconnection in response to the lapse of the predetermined time; and a processor that executes call disconnection processing on the corresponding call in response to the message being received, wherein priorities of communication services employed by the user equipment are assigned to a plurality of groups, the number of the plurality of groups being smaller than the number of types of the priorities, and time durations are set based on a priority of the plurality of groups.

13. A wireless communication method used in a wireless communication system comprising a base station, a user equipment, and a relay station that relays a wireless signal sent and received between the base station and the user equipment, the method comprising:
by the relay station,
assigning priorities of communication services employed by the user equipment to a plurality of groups, the number of the plurality of groups being smaller than the number of types of the priorities;
setting time durations based on a priority of the plurality of groups;
executing reconnection processing with the base station, every time a plurality of time durations with respect to certain timing elapse, for a call corresponding to each time duration; and,
if the relay station is not capable of reconnecting with the base station until a predetermined time elapses after a start of the reconnection processing for the call corresponding to the each time duration, sending a message to the user equipment for notifying a call disconnection of the corresponding call in response to the lapse of the predetermined time, by the user equipment,
receiving the message sent from the relay station; and
executing call disconnection processing on the corresponding call in response to the message being received.

* * * * *